(12) United States Patent
Marinov et al.

(10) Patent No.: US 11,921,491 B2
(45) Date of Patent: *Mar. 5, 2024

(54) CONVERSION OF MESH GEOMETRY TO WATERTIGHT BOUNDARY REPRESENTATION

(71) Applicant: Autodesk, Inc., San Francisco, CA (US)

(72) Inventors: Martin Cvetanov Marinov, Cambridge (GB); Marco Amagliani, Cambridge (GB); Peter Hugh Charrot, Cambridge (GB)

(73) Assignee: Autodesk, Inc., San Francisco, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 17/318,531

(22) Filed: May 12, 2021

(65) Prior Publication Data

US 2021/0263499 A1    Aug. 26, 2021

Related U.S. Application Data

(63) Continuation of application No. 16/388,771, filed on Apr. 18, 2019, now Pat. No. 11,016,470.
(Continued)

(51) Int. Cl.
*G05B 19/4099*   (2006.01)
*B23Q 3/16*       (2006.01)
(Continued)

(52) U.S. Cl.
CPC ........... *G05B 19/4099* (2013.01); *B23Q 3/16* (2013.01); *B29C 64/393* (2017.08); *B33Y 50/00* (2014.12);
(Continued)

(58) Field of Classification Search
CPC ..... G06T 15/00; G06T 11/00; G06T 2219/00; G06T 17/00; G06T 17/20; G06T 17/30;
(Continued)

(56) References Cited

U.S. PATENT DOCUMENTS 8,970,590 B1 * 3/2015 Brennan ................. G06T 17/20
345/581
9,697,326 B1 * 7/2017 Bowman ................ G06F 30/23
(Continued)

OTHER PUBLICATIONS

Authorized officer Katarzyna Nesciobello, International Search Report and Written Opinion in PCT/US2019/034221, dated Sep. 23, 2019, 17 pages.
(Continued)

*Primary Examiner* — Thomas C Lee
*Assistant Examiner* — Anzuman Sharmin
(74) *Attorney, Agent, or Firm* — Fish & Richardson P.C.

(57) ABSTRACT

Methods, systems, and apparatus for computer aided design of physical structures include: producing a quad parameterization computer model (including quad parameter domains) of a polygon mesh, where quad parameter domain(s) adjacent to a boundary curve interpolate the boundary curve; and forming a computer model of a three dimensional object by constructing locally refinable surface representation(s) from the quad parameterization computer model, refining a boundary of the locally refinable surface representation(s) to approximate the boundary curve within a first tolerance value set in accordance with a smallest dimension representable by a geometry modeling kernel, freezing control points of the locally refinable surface representation(s) at the boundary, and modifying remaining interior portions of the locally refinable surface representation(s) to approximate the polygon mesh within a second tolerance value that is at least an order of magnitude larger than the first tolerance value.

22 Claims, 13 Drawing Sheets

Related U.S. Application Data

(60) Provisional application No. 62/758,053, filed on Nov. 9, 2018.

(51) Int. Cl.
*B29C 64/393* (2017.01)
*B33Y 50/00* (2015.01)
*B33Y 50/02* (2015.01)
*G06F 30/00* (2020.01)
*G06F 30/10* (2020.01)
*G06F 113/10* (2020.01)
*G06F 119/18* (2020.01)
*G06T 17/00* (2006.01)
*G06T 17/20* (2006.01)
*G06T 17/30* (2006.01)

(52) U.S. Cl.
CPC .............. *B33Y 50/02* (2014.12); *G06F 30/10* (2020.01); *G05B 2219/35134* (2013.01); *G05B 2219/49007* (2013.01); *G06F 2113/10* (2020.01); *G06F 2119/18* (2020.01)

(58) Field of Classification Search
CPC ...... G05B 19/4099; G05B 2219/35134; G05B 2219/49007; B23Q 3/16; B29C 64/393; B33Y 50/00; B33Y 50/02; G06F 30/10; G06F 2113/10; G06F 2119/18; G06F 30/00; Y02P 90/02
See application file for complete search history.

(56) References Cited

U.S. PATENT DOCUMENTS

| | | | |
|---|---|---|---|
| 9,902,114 | B2 | 2/2018 | Musuvathy |
| 2003/0191554 | A1 | 10/2003 | Russell et al. |
| 2011/0087350 | A1 | 4/2011 | Fogel et al. |
| 2016/0224693 | A1 | 8/2016 | Maisonneuve |
| 2017/0037518 | A1 | 2/2017 | Oxford et al. |
| 2017/0357736 | A1* | 12/2017 | Schmitter ............... G06F 17/11 |
| 2019/0303532 | A1* | 10/2019 | Urick ....................... G06F 30/23 |
| 2020/0150624 | A1 | 5/2020 | Marinov et al. |

OTHER PUBLICATIONS

Authorized officer Katarzyna Nesciobello, International Search Report and Written Opinion in PCT/US2019/060589, dated Mar. 31, 2020, 16 pages.
Biermann et al., "Approximate Boolean Operations on Free-form Solids", in: Proc. of SIGGRAPH 01, 2001, pp. 185-194. URL https://mrl.nyu.edu/publications/booleans/booleans2001.pdf.
Biermann et al., "Sharp Features on Multiresolution Subdivision Surfaces", Graphical Models 64 (2) (2002) 61-77. doi:10.1006/gmod.2002.0570. URL http://linkinghub.elsevier.com/retrieve/pii/S1524070302905709.
Bommes et al., "Integer-grid Maps for Reliable Quad Meshing", ACM Transactions on Graphics 32 (4) (2013) 1. doi: 10.1145/2461912.2462014. URL http://dl.acm.org/citation.cfm?doid=2461912.2462014.
Bommes et al., "Mixed-integer Quadrangulation", ACM Transactions on Graphics 28 (3) (2009) 1. doi: 10.1145/1531326.1531383. URL http://portal.acm.org/citation.cfm?doid=1531326.1531383.
Campen et al., "Aligned Parameterization", Computer Graphics Forum 33 (8) (2014) 69-81.
Campen et al., "Quantized Global Parametrization", ACM Transactions on Graphics 34 (6) (2015) 1-12. doi: 10.1145/2816795.2818140. URL http://dl.acm.org/citation.cfm?doid=2816795.2818140.
Eck et al., "Automatic Reconstruction of B-spline Surfaces of Arbitrary Topological Type", in: Proceedings of the 23rd annual conference on Computer graphics and interactive techniques—SIGGRAPH '96, 1996, pp. 325-334. doi:10.1145/237170.237271. URL http://portal.acm.org/citation.cfm?doid=237170.237271.
Gregory et al., "A C1 Triangular Interpolation Patch for Computer-aided Geometric Design", Computer Graphics and Image Processing 13(1) (1980) 80-87. doi: 10.1016/0146-664X(80)90117-3. URL https://www.sciencedirect.com/science/article/pii/0146664X80901173.
J. W. Peterson, "Arc Length Parameterization of Spline Curves", Journal of Computer-Aided Design 14 (2) (2006) 1-11.
Joshi et al., A. Yurova, "CAD-integrated Topology Optimization", (Dec. 31, 2016), XP055621476, retrieved from the Internet: URL:https://www5.in.tum.de/pub/bgceproject2016report.pdf), 77 pages.
Levin, "Combined Subdivision Schemes for the Design of Surfaces Satisfying Boundary Conditions", preprint submitted to Elsevier Preprint (Nov. 23, 1998). URL http://citeseerx.ist.psu.edu/viewdoc/download?doi=10.1.1.16.4022&rep=rep1&type=pdf.
Levin, "Interpolating Nets of Curves by Smooth Subdivision Surfaces", Proceedings of the 26th annual conference on Computer graphics and interactive techniques—SIGGRAPH '99 (1999) 57-64 doi: 10.1145/311535.311541. URL http://portal.acm.org/citation.cfm?doid=311535.311541.
Li et al., "Automatic and Interactive Mesh to T-spline Conversion", in: Proceedings of the Fourth Eurographics Symposium on Geometry Processing, 2006, pp. 191-200. doi: 10.1145/1281957.1281982. URL http://dl.acm.org/citation.cfm?id=1281957.1281982.
Litke et al., "Fitting Subdivision Surfaces", in: IEEE Visualization 2001, 2001, pp. 319-324. URL http://www.multires.caltech.edu/pubs/fitting.pdf.
Litke et al., "Trimming for Subdivision Surfaces", Computer-Aided Geometric Design 18 (5) (2001) 463-481. URL http://www.multires.caltech.edu/pubs/trimming.pdf.
Marinov et al., "Generative Design Conversion to Editable and Watertight Boundary Representation," Computer-Aided Design, May 2019, 115:194-205.
Marinov et al., "Boundary Conforming Mesh to T-NURCC Surface Conversion," Computers & Graphics, May 2019, 82:95-105.
S. A. Coons, "Surfaces for Computer-aided Design of Space Forms", Technical Report (1967). URL https://dl.acm.org/citation.cfm?id=889976.
Sabin, "Transfinite Surface Interpolation", in: Proceedings of the 6th IMA Conference on the Mathematics of Surfaces, Clarendon Press, New York, NY, USA, 1996, pp. 517-534.
Scott et al., "Local refinement of analysis-suitable T splines", Computer Methods in Applied Mechanics and Engineering 213-216 (2012) 206 222.
Sederberg et al., "T-spline simplification and local refinement", in: ACM SIGGRAPH 2004 Papers on—SIGGRAPH '04, 2004, p. 276. doi:10.1145/1186562.1015715. URL http://portal.acm.org/citation.cfm?doid=1186562.1015715.
Sederberg et al., "T-splines and T-NURCCs", in: ACM Transactions on Graphics, vol. 22, 2003, p. 477. doi: 10.1145/882262.882295. URL http://portal.acm.org/citation.cfm?doid=882262.882295.
Sederberg et al., "Watertight Trimmed NURBS", in: ACM SIGGRAPH 2008 papers on—SIGGRAPH '08, vol. 27, ACM Press, New York, New York, USA, 2008, p. 1. doi:10.1145/1399504.1360678. URL http://portal.acm.org/citation.cfm?doid=1399504.1360678.
Sharpe et al., "Numerical method for extracting an arc length parameterization from parametric curves", Computer-Aided Design 14 (2) (1982) 79-81.
Shen et al., "Converting a CAD Model into a Non-uniform Subdivision Surface", Computer Aided Geometric Design 48 (2016) 17-35. doi:10.1016/j.cagd.2016.07.003. URL https://linkinghub.elsevier.com/retrieve/pii/S0167839616300899.
Unknown Author, "Topology Optimization R18.0 Feature and Usage Highlights Additive Manufacturing Application", (Mar. 12, 2017), XP055621368, retrieved from the Internet: URL:https://www.fluidcodes.com/archives/products/1489307672-Topology%20Optimization%20180%20Features.pdf, 29 pages.
Wang et al., "Adaptive T-spline Surface Approximation of Triangular Meshes", in: 2007 6th International Conference on Informa-

(56) References Cited

OTHER PUBLICATIONS tion, Communications and Signal Processing, ICICS, IEEE, 2007, pp. 1-5. doi:10.1109/ICICS.2007.4449775. URL http://ieeexplore.ieee.org/document/4449775/.

* cited by examiner

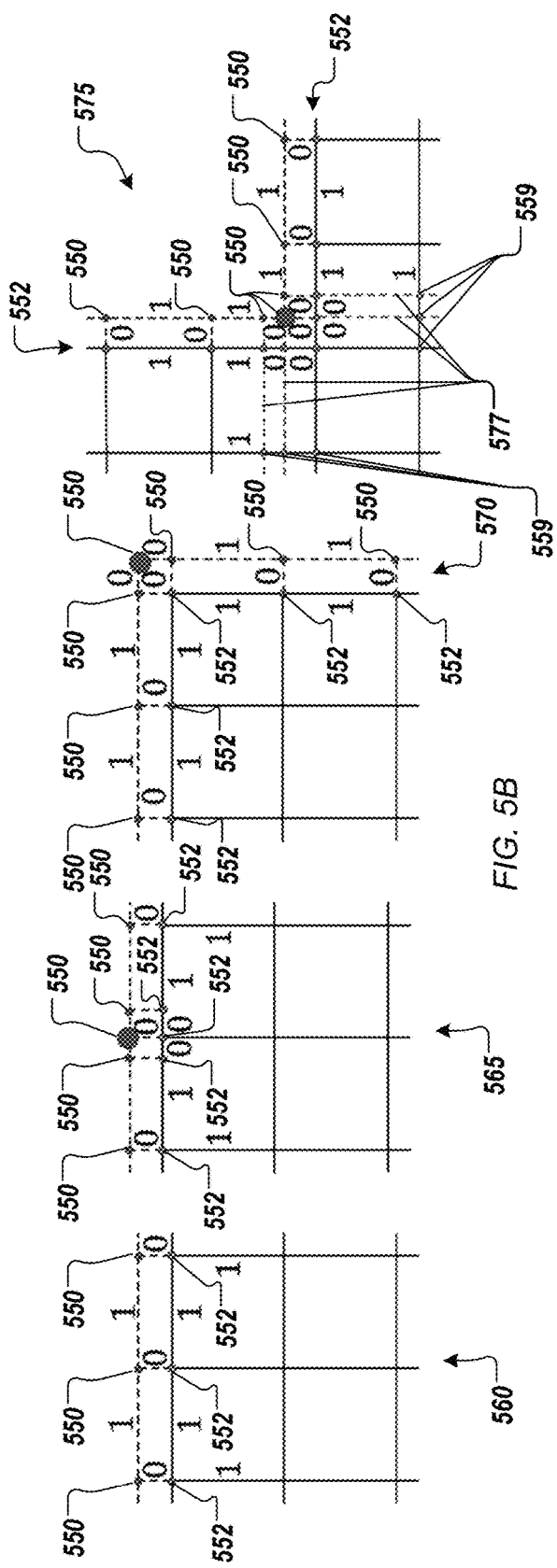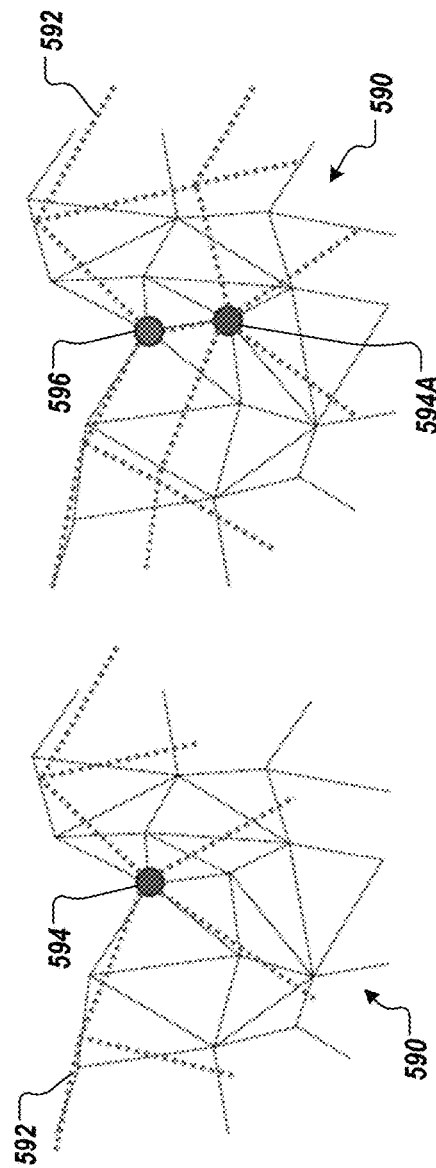
FIG. 5B
FIG. 5C

CONVERSION OF MESH GEOMETRY TO WATERTIGHT BOUNDARY REPRESENTATION

CROSS-REFERENCE TO RELATED APPLICATIONS

This application is a continuation application of, and claims the benefit of priority to, U.S. patent application Ser. No. 16/388,771, filed on Apr. 18, 2019, and issuing on May 25, 2021 as U.S. Pat. No. 11,016,470, which claims the benefit under 35 U.S.C. § 119(e) of U.S. Patent Application No. 62/758,053, entitled "CONVERSION OF GENERATIVE DESIGN GEOMETRY TO EDITABLE AND WATERTIGHT BOUNDARY REPRESENTATION IN COMPUTER AIDED DESIGN", filed Nov. 9, 2018, which is incorporated herein by reference in its entirety.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of mesh model geometry, which can be difficult to work with in a CAD program.

Further, CAD programs have been used in conjunction with subtractive manufacturing systems and techniques. Subtractive manufacturing refers to any manufacturing process where 3D objects are created from stock material (generally a "blank" or "workpiece" that is larger than the 3D object) by cutting away portions of the stock material. Such manufacturing processes typically involve the use of multiple CNC machine cutting tools in a series of operations, starting with a roughing operation, an optional semi-finishing operation, and a finishing operation. In addition to CNC machining, other subtractive manufacturing techniques include electrode discharge machining, chemical machining, waterjet machining, etc. In contrast, additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Other manufacturing techniques for building 3D objects from raw materials include casting and forging (both hot and cold).

In addition, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use) as well as aesthetic and manufacturability constraints. Further, the inputs to a generative design process can include a set of input solids (B-Rep input) that specify boundary conditions for the generative design process, but many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver.

SUMMARY

This specification relates to computer aided design of physical structures, which can be manufactured using additive manufacturing, subtractive manufacturing and/or other manufacturing systems and techniques.

In general, one or more aspects of the subject matter described in this specification can be embodied in one or more methods (and also one or more non-transitory computer-readable mediums tangibly encoding a computer program operable to cause data processing apparatus to perform operations) including: obtaining, in a computer aided design program, a first three dimensional model of an object to be manufactured, wherein the first three dimensional model includes a polygon mesh associated with one or more modelled solids, the one or more modelled solids being in a boundary representation format; producing from the polygon mesh, by the computer aided design program, a quad patch network that combines, using transfinite interpolation, the polygon mesh with one or more smooth boundary curves corresponding to the one or more modelled solids; defining, by the computer aided design program, one or more locally refinable smooth surface representations using the quad patch network as input and based at least in part on a smallest dimension representable by a geometry modeling kernel of the computer aided design program; and combining, by the computer aided design program, the one or more locally refinable smooth surface representations with the one or more modelled solids to form a second three dimensional model of the object that is watertight at the one or more smooth boundary curves.

The polygon mesh can result from a generative design process employing the one or more modelled solids as one or more sub-spaces of an optimization domain of the generative design process. The generative design process can employ a volumetric mesh method or a level set method to create the generative design for the object, and the polygon mesh can include a triangle mesh, either originally or by conversion thereto.

The producing can include: extracting from the polygon mesh a quad patch layout for the quad patch network, wherein the quad patch layout represents a quad partitioning of a domain of a globally continuous map of the polygon mesh; mapping at least one boundary of the quad patch layout to the one or more smooth boundary curves corresponding to the one or more modelled solids; and constructing surface patches using the globally continuous map of the polygon mesh, the mapping of the at least one boundary of the quad patch layout to the one or more smooth boundary curves, and transfinite interpolation of the one or more smooth boundary curves. The method can include receiving user input specifying a quad size, a quad shape, or both, for use in the quad patch network.

The defining can include: constructing one or more initial locally refinable smooth surface representations based on the quad patch network; refining the one or more initial locally refinable smooth surface representations at one or more boundaries of the one or more initial locally refinable smooth surface representations to approximate the one or more smooth boundary curves within a first tolerance value that is equal to or greater than the smallest dimension representable by the geometry modeling kernel of the computer aided design program and is within a supported tolerance range of the geometry modeling kernel of the computer aided design program; freezing control points of the one or more locally refinable smooth surface representations at the one or more boundaries; and modifying remaining interior portions of the one or more locally refinable smooth surface representations to approximate the polygon mesh within a second tolerance value that is equal to or greater than an accuracy of a method used to obtain the polygon mesh and is at least an order of magnitude larger than the first tolerance value.

The method can include receiving user input specifying the second tolerance value. The method can include: identifying at least one negative boundary cross-field singularity for the polygon mesh; and relocating the at least one negative boundary cross-field singularity to an interior vertex of the polygon mesh. The combining can include using a stitch operation to connect the one or more locally refinable smooth surface representations to the one or more modelled solids in the boundary representation format.

The computer aided design program can include two or more programs that operate cooperatively on two or more separate computer processors. The method can include providing, by the computer aided design program, the second three dimensional model for use in manufacturing a physical structure corresponding to the object using one or more computer-controlled manufacturing systems. The providing can include saving the second three dimensional model to a permanent storage device for use in manufacturing the physical structure corresponding to the object using the one or more computer-controlled manufacturing systems. The one or more computer-controlled manufacturing systems can include an additive manufacturing machine or a subtractive manufacturing machine, and the providing can include: generating toolpath specifications for the additive manufacturing machine or the subtractive manufacturing machine using the second three dimensional model; and manufacturing at least a portion of the physical structure corresponding to the object with the additive manufacturing machine or the subtractive manufacturing machine using the toolpath specifications generated for the additive manufacturing machine or the subtractive manufacturing machine.

In addition, one or more aspects of the subject matter described in this specification can be embodied in one or more systems that employ the one or more methods and the one or more non-transitory computer-readable mediums, e.g., a non-transitory storage medium having instructions of a computer aided design program stored thereon; and one or more data processing apparatus able to run the instructions of the computer aided design program to perform operations (as described herein) specified by the instructions of the computer aided design program. The mesh can result from a generative design process employing the one or more modelled solids as one or more sub-spaces of an optimization domain of the generative design process, and the second tolerance value can be set based on a representation accuracy of the generative design process. The system can include one or more computer-controlled manufacturing systems including an additive manufacturing machine or a subtractive manufacturing machine, wherein the one or more data processing apparatus are able to run the instructions of the computer aided design program to generate toolpath specifications for the additive manufacturing machine or the subtractive manufacturing machine from the three dimensional model, and to manufacture at least a portion of a physical structure corresponding to the object with the additive manufacturing machine or the subtractive manufacturing machine using the toolpath specifications generated for the additive manufacturing machine or the subtractive manufacturing machine.

Particular embodiments of the subject matter described in this specification can be implemented to realize one or more of the following advantages. A general topology mesh (e.g., an organic shape mesh produced by a physics solver of a generative design process) can be approximated with one or more locally refinable smooth surface representations (e.g., Non-Uniform Rational Catmull-Clark Surfaces with T-junctions (T-NURCCs)) while also fitting the smooth surface representations to a set of smooth boundary curves, used to refine the mesh boundary, to a level of precision that produces a watertight boundary representation (e.g., B-Rep) model. The smooth boundary curves can be specified by the application to ensure that the produced surface conforms precisely to existing geometry, such as patch boundaries, intersections, and trim-curves. The produced, smooth surfaces can be fit to mathematically precise, smooth boundary curves using a different tolerance value than that used to fit the interior portion of the smooth surface with the mesh.

The approximation tolerance of the produced, smooth surfaces can be guaranteed to be within a limit that ensures the surfaces will attach to the rest of the 3D model, while also approximating a mesh with a looser tolerance away from the smooth boundary curves in a seamless manner. For example, the produced surfaces (e.g., T-NURCCs) can approximate the smooth boundary curves to within 3-6 orders of magnitude smaller than the dimensions of the 3D model itself, so they are essentially as good as precise intersections, and they replace precise intersections when the produced surfaces are stitched to the solids in the 3D model. Thus, watertight integration of locally refinable smooth surface representations (e.g., T-NURCCs) into modelled solids (e.g., B-Reps) is enabled, where free-form, organic-like shapes are flanked by classical CAD surfaces, such as planes, cylinders, and Non-Uniform Rational Basis Spline (NURBS) patches. Applications of the systems and techniques described include reverse engineering (object scanning) and topology optimization and generative design, where meshes often mix and match organic and non-organic forms.

The systems and techniques described facilitate the use of generative design and topology optimization, which offer a quick and cost-effective way to obtain optimized geometry that fulfills physical design requirements. Most physics solvers operate on volumetric representations such as level sets and tetrahedral meshes, and the optimized designs are typically exported as meshes. To integrate these designs in a CAD assembly, rather than a CAD engineer having to remodel the synthesized shape from scratch using traditional modeling techniques, at a significant time cost, the systems and techniques described herein can be used to readily convert the mesh to smooth surface(s) that can be efficiently processed in a CAD program (e.g., readily editable without requiring extensive processing time) and seamlessly integrated with the rest of the CAD model. Moreover, the availability of precise geometry allows performance of the final-precise simulation and verification of the mechanical/aesthetic properties of the body. This verification is usually not precise on meshes because they define a shape in an approximate way. For example, on a mesh it is not possible to check if the curvature is continuous.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIG. 5B is a graphical diagram showing four boundary conditions.

FIG. 5C is a graphical diagram showing an example of boundary singularity relocation.

Like reference numbers and designations in the various drawings indicate like elements.

DETAILED DESCRIPTION

Figure 1:
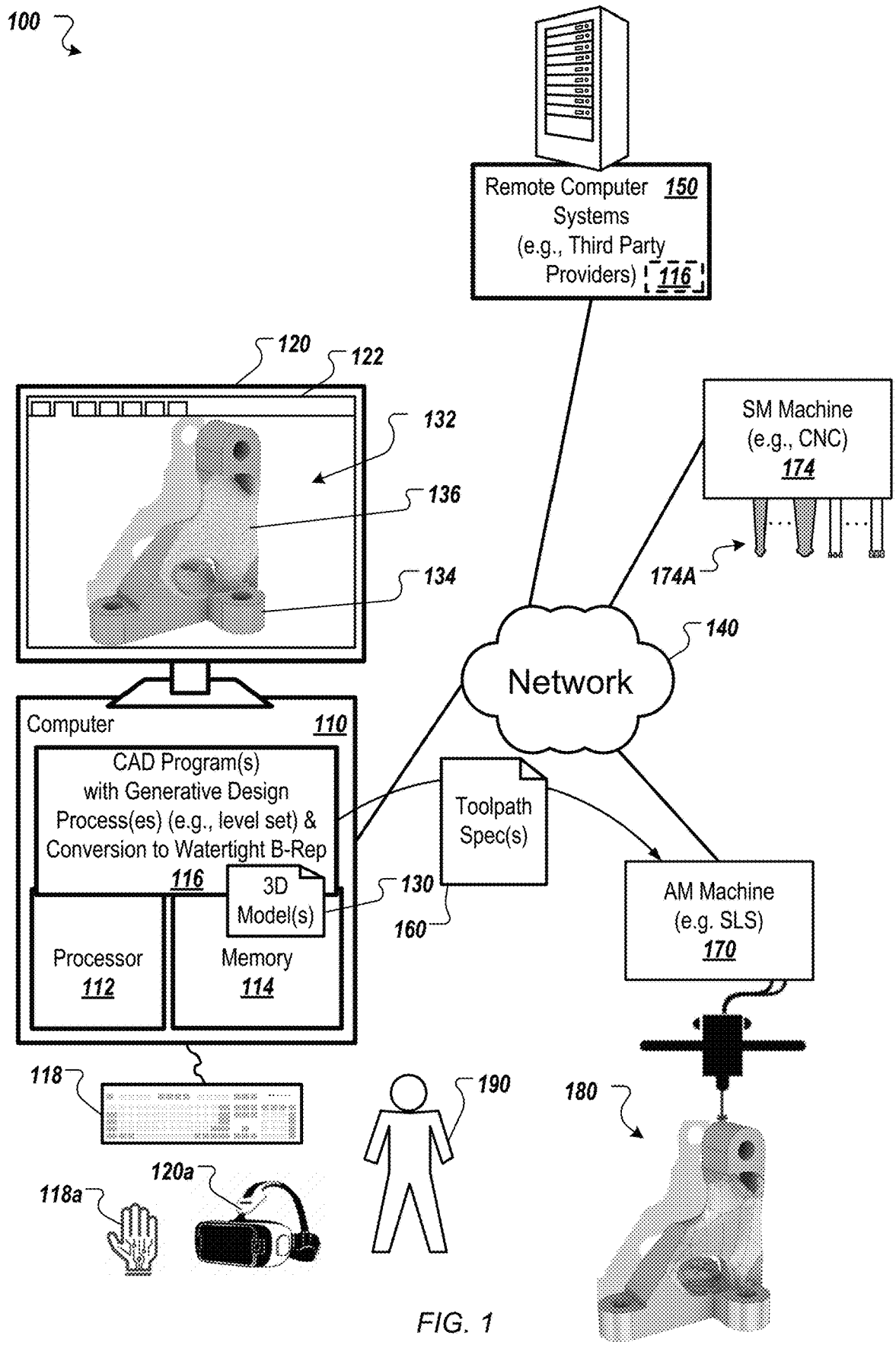
FIG. 1 shows an example of a system usable to design and manufacture physical structures.

FIG. 1 shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and conversion of mesh geometry to a watertight boundary representation for a part to be manufactured. The mesh geometry can be obtained from different sources, but generally, the mesh geometry will be associated with one or more modelled solids that are in a boundary representation format.

For example, the system 100 can include a 3D scanner (not shown) that scans a physical object 180 to generate a mesh representation of the physical object, and the CAD program(s) 116 can use this input mesh to generate the one or more modelled solids (e.g., B-Reps) by fitting regular geometrical shapes to the mesh, and the CAD program(s) 116 can use the systems and techniques described herein to convert remaining portions of the mesh (those portions that are too complex to be modeled using regular geometrical shapes) to a boundary representation format (e.g., B-Reps) and connect them with the one or more modelled solids. In this example, the CAD program(s) 116 include scanning and modelling functions.

As another example, the CAD program(s) 116 can implement one or more generative design processes that employ material or microstructure techniques and/or geometrical or macrostructure techniques for generative design (e.g., Solid Isotropic Material with Penalization (SIMP) and/or level-set methods for topology optimization). The one or more modelled solids can be produced in (or loaded into) the CAD program(s) using traditional 3D modelling techniques, and these modelled solid(s) can be used as one or more subspaces of an optimization domain of a generative design process. Thus, the generative design process can output a mesh representing automatically generated geometry that is to connect with the modelled solid(s) used as input. Further, the CAD program(s) 116 can implement physical simulation (finite element analysis (FEA) or other) and also manufacturing control functions, in various implementations.

As used herein, CAD refers to any suitable program used to design physical structures that meet specified design requirements, regardless of whether or not the program is capable of interfacing with and/or controlling specific manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., mesh conversion, generative design and/or physical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a.

As noted above, the CAD program(s) 116 implement 3D modeling functions, which means a 3D model 132 can be built using the CAD program(s) 116. The CAD program(s) 116 can implement physical simulation (locally and/or by remote procedure call) to assist in building the 3D model 132. Physical simulations, such as FEA, Computational Fluid Dynamics (CFD), Acoustics/Noise Control, thermal conduction, and/or computational injection molding simulations are often integral components in CAD-based product development. The CAD program(s) 116 can be used to build precise geometric descriptions of the design model, while physical simulations enable improved performance without time consuming physical testing.

The CAD program(s) 116 can provide user interface elements that enable the user to specify inputs for physical simulation(s), such as materials and loading cases for the 3D model(s) 132, where the loading cases define loads in different directions to be borne by a part being designed during use of the part. Thus, a user 190 can interact with the UI 122 of the CAD program(s) 116, including producing a full mechanical problem definition for a part to be manufactured, so as to build and modify 3D model(s) 132, which can be stored in 3D model document(s) 130. In the example of FIG. 1, the 3D model 132 is of a specific bracket, but this is merely one of many possible 3D models that can be designed using the systems and techniques described herein.

Moreover, the CAD program(s) 116 can implement at least one generative design method (locally and/or by remote procedure call) which enables the CAD program(s) 116 to generate one or more portions of the 3D model(s) 132 automatically (or the entirety of a 3D model) based on design criteria, where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources. The design criteria can be defined by the user 190, or by another party and imported into the CAD program(s) 116. For example, a design space, load cases, and design criteria can be obtained for the modelled object by the CAD program(s) 116 by receiving user input, e.g., via UI 122 on display device 120.

In the example shown, the 3D model 132 includes a modelled solids portion 134 and a mesh portion 136. The modelled solid(s) 134 are used as input (e.g., B-Reps that are preserve bodies input) to the generative design process, which generates the mesh 136 in view of the boundary conditions set by the input geometry. Various generative design processes can be used to optimize the shape and topology of the mesh portion 136 of the 3D model 132. The input solid(s) 134 can be converted to mesh geometry for use as input to the generative design process, and the mesh output from the generative design processes can include mesh portions that correspond to the input solid(s) 134, and these portions can be removed to result in the mesh portion 136. This mesh portion 136 is then converted into the boundary representation format (e.g., B-Rep, T-spline, subdivision surface, and/or other computer 3D modelling formats) and connected to the modelled solids portion 134 to form a watertight model 132 at the boundary between the two portions 134, 136.

In addition, in some implementations, the CAD program(s) 116 implement manufacturing control functions. Once the user 190 is satisfied with a 3D model 132, the 3D model 132 can be stored as the 3D model document(s) 130 and/or used to generate another representation of the model (e.g., an .STL file for additive manufacturing). This can be done upon request by the user 190, or in light of the user's request for another action, such as sending the 3D model 132 to additive manufacturing (AM) machine(s) 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 160 (having toolpath specifications of an appropriate format) to the AM machine 170 to produce the physical structure 180. The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In some cases, the AM machine 170 builds the physical structure 180 directly, and in some cases, the AM machine 170 builds a mold for use in casting or forging the physical structure 180. In addition, the user 190 can save or transmit the 3D model 132 for later use. For example, the CAD program(s) 116 can store the document(s) 130 that includes the 3D model 132.

In some implementations, the CAD program(s) 116 implement manufacturing control functions for subtractive manufacturing (SM) machine(s) 174 (e.g., a Computer Numerical Control (CNC) milling machine, such as a multi-axis, multi-tool milling machine) to be used in the manufacturing process. For example, the CAD program(s) 116 can generate CNC instructions for a machine tool system 174 that includes multiple tools 174A (e.g., solid carbide round tools of different sizes and shapes, and insert tools of different sizes that receive metal inserts to create different cutting surfaces) useable for various machining operations. Thus, in some implementations, the CAD program(s) 116 can provide a corresponding document 160 (having toolpath specifications of an appropriate format, e.g., a CNC numerical control (NC) program) to the SM machine 174 for use in manufacturing the physical structure 180 using various cutting tools, etc.

In some implementations, the CAD program(s) 116 provide instructions to build a workpiece 180 in a first stage of manufacturing, e.g., using direct AM and/or using forging and/or casting methods, and the CAD program(s) 116 also provide instructions to machine the workpiece 180, e.g., roughing and/or finishing operations, in a second stage of manufacturing, e.g., in a 3-axis CNC milling system in order to form the completed structure. In general, various different manufacturing systems and techniques can be employed, either alone or in combination, to produce a final structure, and the CAD program(s) 116 can include suitable algorithms to generate toolpath specifications 160 for one or more of these various systems to manufacture a part that has been designed using the systems and techniques described in this application.

Figure 2A:
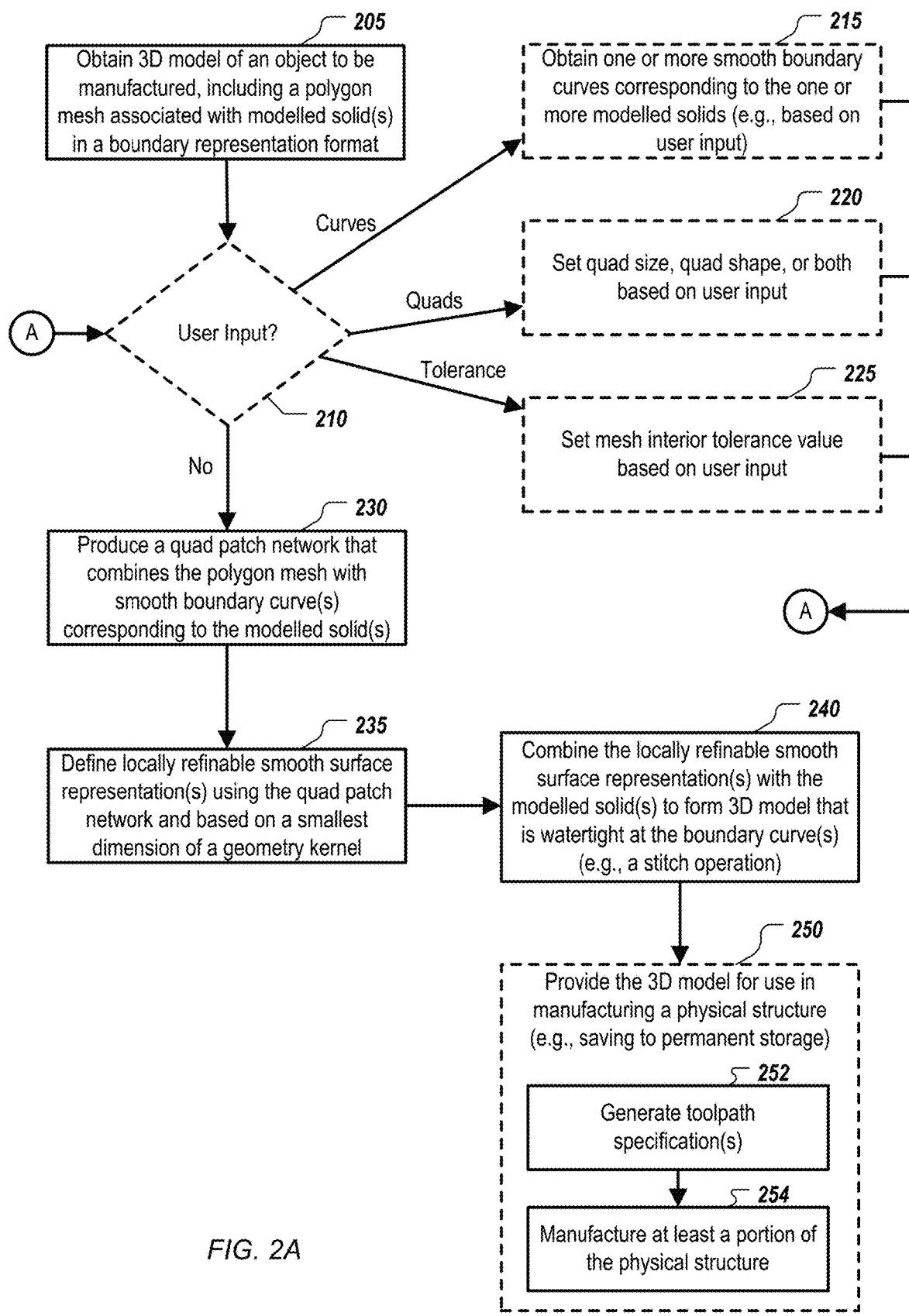
FIG. 2A shows an example of a process to convert mesh geometry to a watertight boundary representation for an object to be manufactured.

FIG. 2A shows an example of a process to convert mesh geometry to a watertight boundary representation for an object to be manufactured. A first 3D model of the object is obtained 205, e.g., by the CAD program(s) 116. The first 3D model includes a polygon mesh associated with one or more modelled solids. The polygon mesh can be a triangle mesh, either originally or by conversion thereto. Various types of mesh formats can be used as input, including tetrahedral or hexahedral meshes. Further, the one or more modelled solids are in a boundary representation format (e.g., B-Reps) and can be regular geometric shapes that have been fit to a scanned mesh or be modelled solid(s) used as input to a generative design process that employs a volumetric mesh method or a level set method to create a generative design for the object, as described above. Thus, the polygon mesh can be the output from one or more generative design process(es) employing the one or more modelled solids as one or more sub-spaces of an optimization domain of the generative design process.

In some implementations, the input to the process includes an open, general topology mesh M where δM is constrained to a set of smooth (analytical, procedural, spline) curves $\{C_i\}$. These curves represent boundary edges on the residual B-Rep surface and can include intersections, trim curves, patch boundaries, etc. In some implementations, user input can be received 210, e.g., by the CAD program(s) 116, to define one or more input parameters for the mesh to boundary representation conversion process.

For example, user input can be received 210 to define one or more smooth boundary curves (e.g., curves $\{C_i\}$) corresponding to the one or more modelled solids, e.g., the CAD program(s) 116 can provide tools in UI 122 to define the smooth boundary curves. These smooth boundary curves can be obtained 215, based on this user input, and represent boundary edges on the residual B-Rep surface. The boundary curves are smooth in that they are mathematically specified to have a continuous tangent direction at each point of the curve, in contrast with mesh boundaries, which are not smooth as the tangent is discontinuous at every vertex (in general).

In some implementations, the one or more smooth boundary curves corresponding to the one or more modelled solids are obtained 215 automatically, e.g., by the CAD program(s) 116, without user input (e.g., the process moves from obtaining 205 the 3D model directly to obtaining 215 the boundary curve(s) and then potentially directly to producing 230 a quad patch network). For example, a known algorithm can be used to produce the smooth boundary curve(s) on the modelled solid(s) from the mesh and the modelled solid(s).

In some implementations, the smooth boundary curve(s) are produced, e.g., by the CAD program(s) 116, by projecting the boundaries of the mesh on each respective B-Rep, and interpolating the sequence of projected points on the same face of the B-Rep with a curve on that face. Thus, a set of one or more smooth curves is produced for the modelled solid(s) based on the received mesh.

In some implementations, user input can be received 210, e.g., by the CAD program(s) 116, to specify a quad size, a quad shape, or both, for use in producing 230 a quad patch network from the mesh. In such cases, the quad size, quad shape (e.g., angular variations of the quadrilaterals), or both, can be set 220, e.g., by the CAD program(s) 116, based on the user input. In addition, in some implementations, user input can be received 210, e.g., by the CAD program(s) 116, to specify a mesh interior tolerance value for use in defining 235 one or more locally refinable smooth surface representations using the quad patch network. In such cases, the mesh interior tolerance value can be set 225, e.g., by the CAD program(s) 116, based on the user input.

The quad patch network is produced 230, e.g., by the CAD program(s) 116, from the polygon mesh. This can include converting a received mesh into a triangle mesh, as well as additional operations, such as computing a globally continuous quad parameterization map of the mesh and blending the globally continuous quad parameterization map with procedural quad patches that interpolate the one or more smooth boundary curves, as described in further detail below. The quad patch network combines (e.g., using transfinite interpolation) the mesh with the one or more smooth boundary curves corresponding to the one or more modelled solids. A transfinite interpolation construction can define a $C^0$ patch network interpolating the curves at the boundaries and coincident with the mesh in the interior. Thus, a globally continuous quad parameterization model of the mesh can be produced, where the mesh is partitioned by quad parameter domains on the mesh.

One or more locally refinable smooth surface representations are defined 235, e.g., by the CAD program(s) 116, using the quad patch network as input and based at least in part on a smallest dimension representable by a geometry modeling kernel of the computer aided design program, e.g., of the CAD program(s) 116. The $C^0$ patch network can be converted to a T-NURCC surface by applying an approximation algorithm designed to produce a very accurate boundary fit and reproduce exactly all boundary corners. These properties allow a B-Rep modeling kernel to stitch the output T-NURCCs with adjacent B-Rep faces into a watertight, low tolerance B-Rep CAD model, which means the resulting geometry can be processed by downstream CAD modeling operations without risking a separation of the organic and non-organic surfaces. The conversion output can include a T-NURCC surface S, where δS approximates $\{C_i\}$ to a very tight tolerance $\xi>0$ and exactly reproduces all corner points using $G^1$ boundary discontinuities. Therefore, the maximum tolerance from stitching the conversion surface to the residual B-Rep is $<\xi$. Further, the algorithm can also bound the approximation error between M and S to a user-specified tolerance $\delta:\delta \geq \xi>0$. In some implementations, the tolerance δ is related to the coarse geometry representation of the physics solver that synthesized M In any case, the tolerance $\xi$ is dependent on the B-Rep model resolution and, typically, $\delta \gg \xi$.

Further details of the defining 235 are provided below, but note that the one or more locally refinable smooth surface representations can be T-NURCCs, T-splines, LR B-splines, or hierarchical B-splines. Many suitable variations in geometry formats can be used in respective implementations. In any case, a boundary conforming mesh conversion method can make the tolerances extremely small: if $\in >0$ is the underlying B-Rep resolution, i.e., the smallest representable distance in the model, the gap from the conversion to the corresponding B-Rep boundary can be made $<10\in$. In downstream modeling operations, such tiny tolerance is practically equivalent to precise models because it allows the computer aided design program to consider the B-Rep a valid watertight model, i.e., any suitable downstream operation should work on the model.

Note that tolerant modeling provides operations to modify CAD models with gaps between adjacent face surfaces that are greater than the geometry kernel resolution $\in >0$ (also known as tolerant models). This requirement means that these operations are less reliable and harder to implement than operations on precise CAD models, where the maximum gap is less or equal $\in$. Moreover, the reliability of a tolerant modeling operation is strongly dependent on the gap sizes: the larger the gaps, the less likely is that the operation will produce a valid outcome. Hence, minimizing the gap sizes when producing a tolerant model is important for ensuring that the model is useful in downstream modeling. In practice, keeping the gap size $<10\in$ renders tolerant modeling operations as reliable as precise model operations. From a user perspective this means that a tolerant model with maximum gap size $<10\in$ is as good as a precise model.

The one or more locally refinable smooth surface representations are combined 240, e.g., by the CAD program(s) 116, with the one or more modelled solids to form a second 3D model of the object that is watertight at the one or more smooth boundary curves. Note that the second 3D model need not be a separate model, but rather can be an updated version of the first 3D model. The combining can include using a stitch operation to connect the one or more locally refinable smooth surface representations to the one or more modelled solids in the boundary representation format. Other operations can be used, such as a Boolean operation or a cellular modelling operation, but the stitch operation can be faster and simpler. In any case, the result after the combining 240 is a watertight 3D model, which facilitates further processing in that the precise mathematical surfaces are easier to work with using CAD modeling operations (e.g., geometric modeling operations, such as holes, fillets or shells, and creating assembly relationships, such as mechanical joints), physical simulation operations, and CAM operations.

Figure 2B:
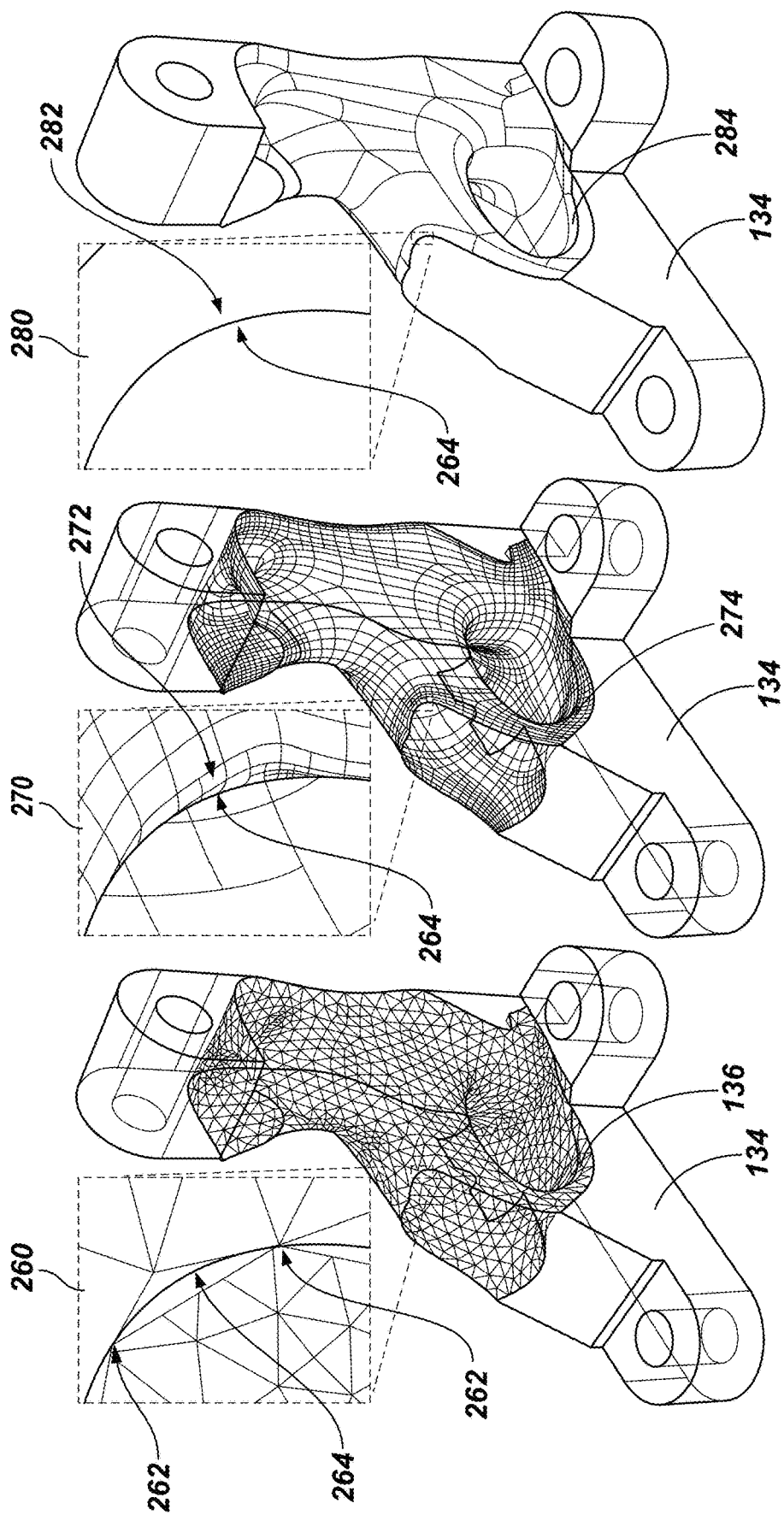
FIG. 2B shows an example of the conversion process of FIG. 2A applied to an organic mesh synthesized by topology optimization of a CAD solid model.

FIG. 2B shows an example of the conversion process of FIG. 2A applied to an organic mesh synthesized by topology optimization of a CAD solid model. In this example, three versions of the 3D model 132 from FIG. 1 are shown. An initial version of the 3D model 132 includes both the modelled solids 134 and the mesh 136. As shown in zoomed in view 260, the mesh boundary vertices 262 are constrained to a trim curve 264 bounding the residual trimmed solid B-Rep surface 134. Note the gaps between the boundary mesh edges 262 and trim curve 264. A T-NURRC surface 274 is constructed that seamlessly approximates the trim curves of the solid B-Rep surface 134 to a very tight tolerance and the mesh interior to a larger tolerance (e.g., ten times, one hundred times, or one thousand times the tight tolerance). As shown in zoomed in view 270, the T-NURRC surface 274 uses more patches 272 near the trim curve 264 to achieve the tight tolerance. In some implementations, the largest boundary deviation is just $4.9 \times 10^{-6}$ times the mesh bounding sphere diameter. Further, as shown in FIG. 2B, the control T-mesh complexity (e.g., 5287 patches) gradually decreases away from the boundary.

Thus, as shown in FIG. 2B, the conversion method is able to seamlessly approximate both $\{C_i\}$ and M, and produce an adaptively structured control T-mesh defining a surface that meets these different boundary and interior approximation requirements. Further, a watertight solid B-rep model can be stitched together from the conversion output and the trimmed solid surfaces; as shown in zoomed in view 280, the generated surface 282 meets the trim curve 264 in a watertight connection. In some implementations, T-spline patches 284 are merged with the modeled solids 134 to produce a simpler final B-Rep face layout. In some implementations, the largest edge tolerance in the stitched B-Rep is $3\in$, where $\in=10^{-6}$ is the model resolution (smallest representable distance).

Returning to FIG. 2A, the watertight 3D model can be provided 250, e.g., by CAD program(s) 116, for use in manufacturing a physical structure corresponding to the object using one or more computer-controlled manufacturing systems, e.g., AM machine 170, SM machine 174, and/or other manufacturing machines. The providing 250 can involve saving the watertight 3D model to a permanent storage device for use in manufacturing the physical structure corresponding to the object using the one or more computer-controlled manufacturing systems, e.g., AM machine 170 and/or SM machine 174. In some implementations, the providing 250 involves generating 252, e.g., by CAD program(s) 116, toolpath specifications for the computer-controlled manufacturing system(s) (e.g., AM machine 170 and/or SM machine 174) using the watertight 3D model, and manufacturing 254, e.g., by CAD program(s) 116, at least a portion of the physical structure corresponding to the object with the computer-controlled manufacturing system(s) (e.g., AM machine 170 and/or SM machine 174) using the toolpath specifications generated for the additive manufacturing machine (e.g., AM machine 170 and/or SM machine 174).

Thus, a boundary conforming mesh conversion method can be designed to meet the requirements of CAD workflows, including generative design and topology optimization CAD workflows. Using a transfinite interpolation construction that seamlessly combines the input mesh with B-Rep boundary curves achieves this goal, as described in detail below. Note that a simple but flawed solution is to replace every triangle with boundary edges with a triangular patch, which interpolates the corresponding boundary curve segments and interior mesh edges. FIG. 3B is a graphical diagram showing examples of inputs used for interpolation.

As shown, interpolating the smooth curve 342 using triangular patches 340 replacing the input triangles adjacent to the boundary affects a surface (in gray) with a jagged, tessellation-dependent shape. This leads to a jagged, tessellation-biased area where $\{C_i\}$ influences the output surface in a limited fashion; only the area of the triangles that are adjacent to the boundary will actually be affected by the boundary curves. In contrast, computing a global quad map of M and blending the map image with procedural quad patches interpolating $\{C_i\}$ at the boundaries of the domain aligns the surface area affected by the interpolated smooth curves with the boundary shape. As shown in FIG. 3B, transfinite interpolation of the smooth curve 342 using procedural quad patches 344 leads to a boundary-shaped surface area (in light gray) that is influenced by the interpolated curve 342, and the influence area is independent of the mesh tessellation shown with dotted lines. Note that all the procedural quad patches 344 are adjacent to the smooth curve 342.

Also, the quad parameterization of the mesh does not replace the mesh and can have different shapes (e.g., more rectangular or more square like or more angular (anisotropic)) and sizes for the quads, thus changing the influence area of the smooth curves on the produced smooth surface. The quad parameterization of the mesh is used to transfinitely interpolate the smooth curves, but the quads are procedural and not actual 3D geometrical quads. Rather, the quad patches 344 are parameter domains on the mesh. The quad patches 344 relate the mesh to the smooth surface to be generated, and the mesh is retained as a source for the generated geometry.

Figure 3A:
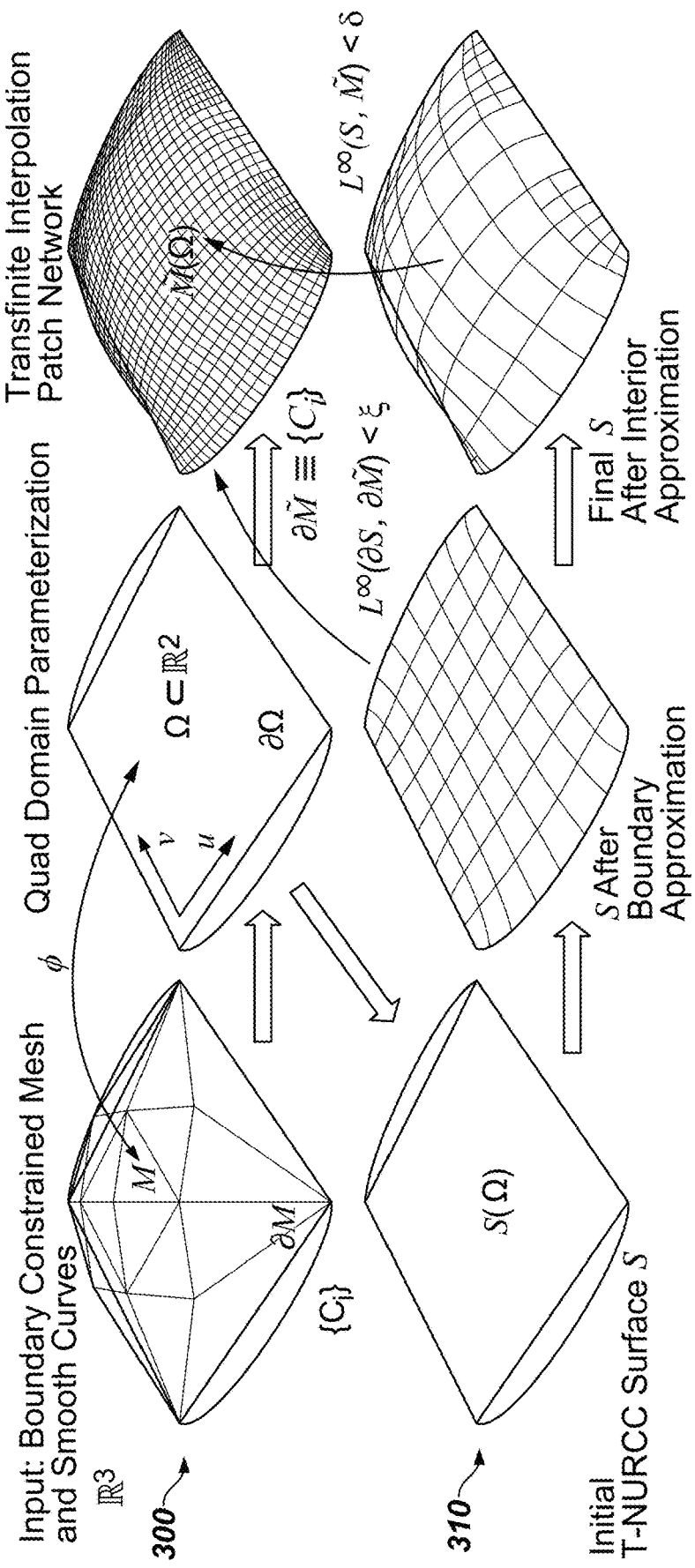
FIG. 3A is a graphical diagram showing an overview of an example of a process to produce a quad patch network and define one or more locally refinable smooth surface representations using the quad patch network.

FIG. 3A is a graphical diagram showing an overview of an example of a process to produce a quad patch network and define one or more locally refinable smooth surface representations using the quad patch network. The process includes two main stages. In the first stage, a $C^0$ quad patch network M is constructed that seamlessly combines the mesh M with the B-Rep boundary curves $\{C_i\}$. Row 300 in FIG. 3A shows the input data and the transfinite interpolation. The quad patch layout of M can be extracted by computing the Integer Grid Map (IGM) $\phi:M\to\Omega\subset\mathbb{R}^2$. Using $\phi^{-1}$, $\delta\Omega$ can be mapped to the input curves $\{C_i\}$, and patches interpolating the displacement field $\{C_i\}-\phi^{-1}(\delta\Omega)$ can be defined. Adding these patches to $M=\phi^{-1}(\Omega)$, obtains the $C^0$ surface $\tilde{M}(\Omega)$ interpolating $\{C_i\}$ at $\delta\tilde{M}(\Omega)$ and coincident with M in the interior.

In the second stage, a T-NURCC surface $S(\Omega)$ can be defined, and the approximation problems $L^\infty(\delta S, \delta\tilde{M})<\xi$ and $L^\infty(S, \tilde{M})<\delta$, where $\delta\geq\xi>0$ can be solved. Row 310 in FIG. 3A shows the flow of the approximation stage. $L^\infty(\delta S, \delta\tilde{M})<\xi$ can be solved first using an iteration of least-squares optimization and error-driven adaptive refinement. The refinement can also include a balancing component that propagates new knots to the surface interior where necessary to ensure the overall process stability. Once the boundary conditions are met, the boundary control points are frozen, and a similar process is carried out in the interior.

Note that using a global tolerance $\delta>L^\infty(S, M)$ to bound the approximation error is unworkable in typical CAD environments because it cannot meet the accuracy requirements of typical CAD applications without introducing a large number of patches for even a modest complexity example of a CAD model, e.g., $2.8\times10^5$ patches for the CAD model shown in FIG. 2B. Thus, the notion of a distinct boundary error bound $\xi:\delta\geq\xi>0$ is introduced. Since in practice $\delta>>\xi$, the proposed techniques can balance the surface refinement to maintain stability while solving the nonlinear problems $L^\infty(\delta S, \{C_i\})<\xi$ and $L^\infty(S, M)<\delta$. This strategy achieves the required boundary accuracy at acceptable time and patch density cost (e.g., the conversion surface for the CAD model shown in FIG. 2B consists of just 5287 patches). In addition, several modifications to the mesh parameterization at the boundary are proposed to represent the corner points ($G^1$ discontinuities) between the input curves more efficiently.

Figure 3C:
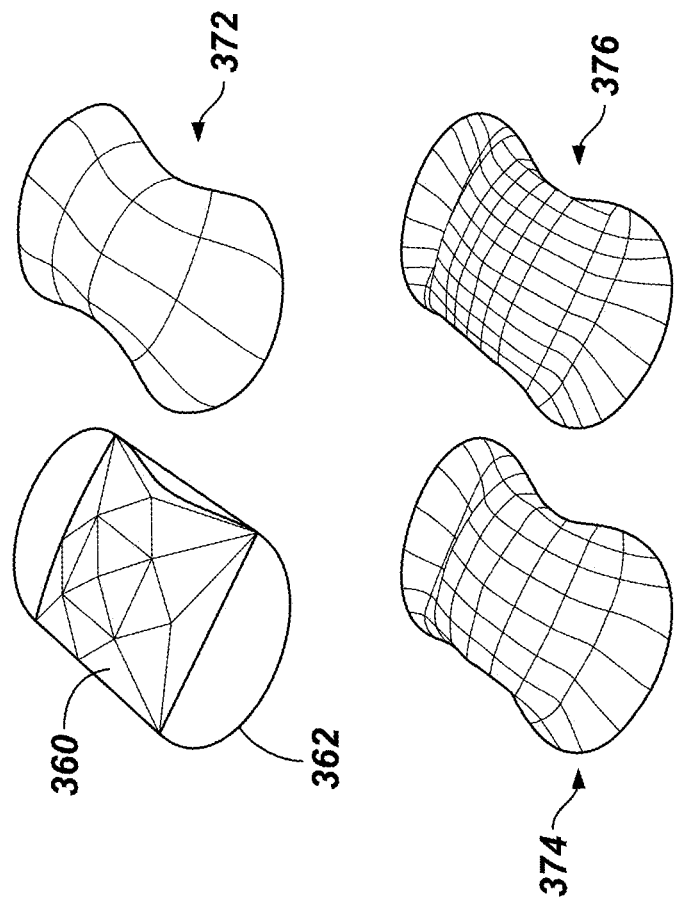
FIG. 3C is a graphical diagram showing examples of the effects of a map size-field on transfinite interpolation construction.
Figure 3B:
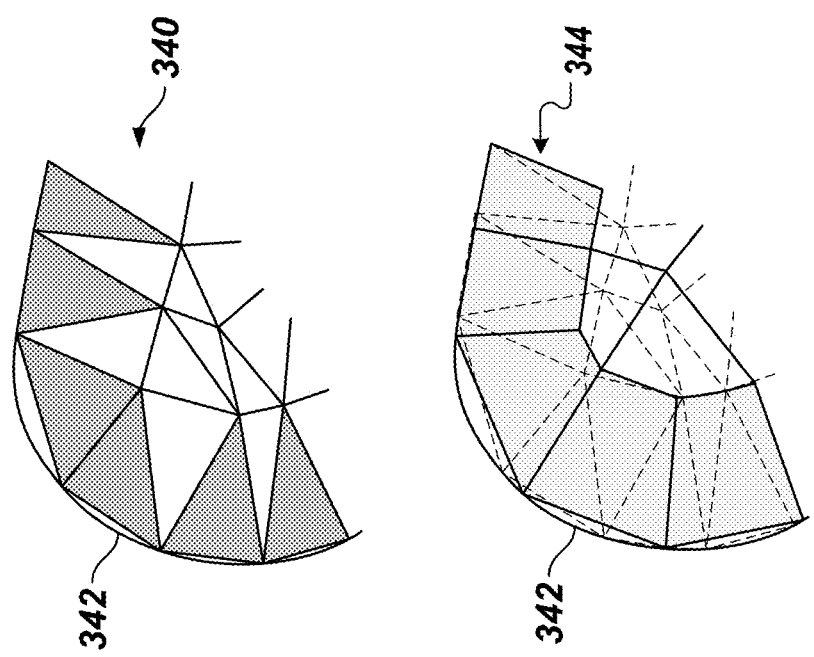
FIG. 3B is a graphical diagram comparing the areas affected by different approaches to transfinite interpolation.

Finally, as noted above, user input can be used in to affect the quad parameterization. FIG. 3C is a graphical diagram showing examples of the effects of a map size-field on transfinite interpolation construction. The input to the process in this example is a dome-shaped mesh 360 with four boundary edges to be constrained to a smooth curve 362. Three different conversion outputs are also shown in FIG. 3C, where the target quad size is halved for each subsequent example. A first example 372 shows the result generated using a first (large) quad size, a second example 374 shows the result generated using a second (medium) quad size, and a third example 376 shows the result generated using a third (small) quad size. As shown, the quad parameterization generates quad shapes that have curved edges and that interpolate both the smooth curve 362 at the boundary and mesh 360 in the interior. Also as shown, the surface area influenced by the curve 362 progressively decreases, but maintains alignment with the curve shape (note that error-driven refinement of the surface domain is disabled for these examples of conversions to illustrate the transfinite interpolation construction in isolation from the rest of the process). Thus, the extent of the curve influence can be controlled by a user-specified size-field independently of the mesh tessellation, and the end result is still a seamlessly continuous surface that combines the curve 362 and mesh 360 geometry.

Figure 4A:
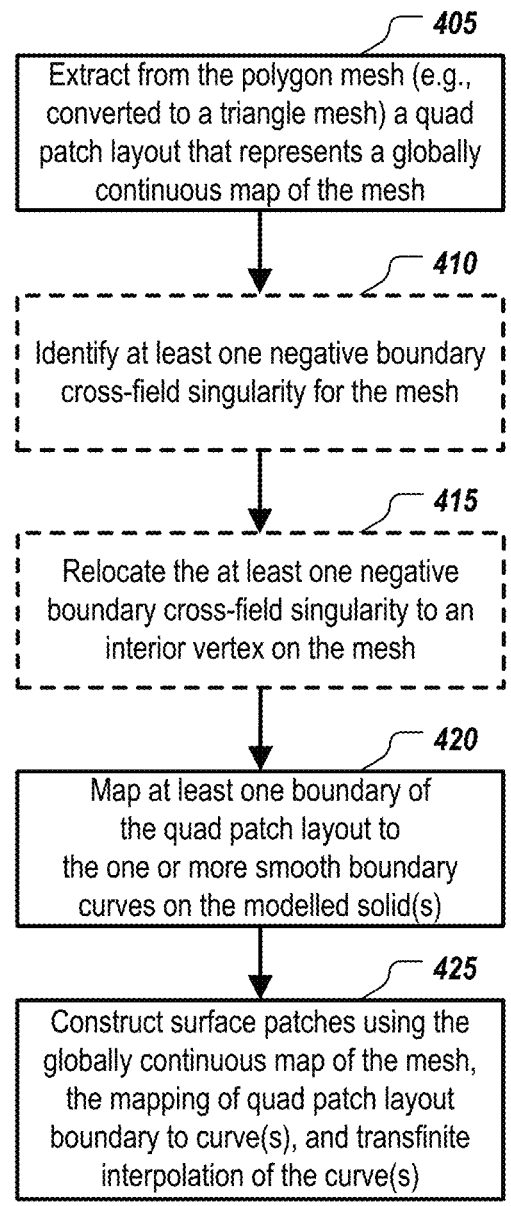
FIG. 4A is a flowchart showing an example of a process to produce a quad patch network.

FIG. 4A is a flowchart showing an example of a process to produce a quad patch network (e.g., an example of producing 230 in FIG. 2A). In general, a continuous model is defined, where the continuous model combines the curves and the mesh; transfinite interpolation construction of a patch network enables the definition of a seamless, continuous surface that combines the mesh with the smooth curves, which facilitates seamless integration of meshes with CAD models in a watertight manner that readily supports downstream 3D modeling operations. Such automatic conversion of meshes to smooth surfaces, which can be integrated in watertight, low tolerance B-Rep models, is a key enabler for generative design and topology optimization CAD workflows.

A quad patch layout is extracted 405 from a polygon mesh (e.g., a triangle mesh). The quad patch layout represents a quad partitioning of the parameter domain $\Omega$ of a globally continuous map $\phi: M\to\Omega$ of the mesh M. In some implementations, the input includes a general topology, orientable 2-manifold mesh $M=(\{V_i\}, \{E_i\}, \{T_i\})$, with boundary and $C^1$ curve segments $\{C_i(t):t\in[t_i,1]\}$ assigned to the boundary edges. $\{V_i\}$, $\{E_i\}$, $\{T_i\}$ are the mesh vertices, edges and triangles. Without loss of generality, $\{T_i\}$ can be assumed to be oriented counterclockwise. $\delta M$ is constrained to the curve segments, i.e., for each $E_i=V_{i,0}$, $v_{i,1}\subset\delta M$, we have $C_i(t_{i,0})=V_{i,0}$ and $C_i(t_{i,1})=V_{i,0}$, $v_{i,1}\subset\delta M$, we have $C_i(t_{i,0})=V_{i,0}$ and $C_i(t_{i,1})=V_{i,1}$.

In some implementations, the map $\phi$ is computed by applying the Integer Grid Map (IGM) method, as described in D. Bommes, M. Campen, H.-C. Ebke, P. Alliez, L. Kobbelt, Integer-grid maps for reliable quad meshing, ACM Transactions on Graphics 32 (2013), quantized efficiently as proposed in M. Campen, D. Bommes, L. Kobbelt, Quantized global parametrization, ACM Transactions on Graphics 34 (2015). The map image $\Omega$ can be partitioned in the unit quad layout $Q_i:\Psi_i+[0,1]^2$, $\Psi_i\in Z^2, \{Q_i\cup Q_i=\Omega\}$ $\Psi_i$, and $Y_1$ denotes the quad layout vertices and edges respectively. The IGM inverse map $\phi^{-1}: \Omega\to M$ plays an important role in the construction: given $Q_i$ and $(u, v)\in[0,1]^2$, $\phi^{-1}(Q_i, u, v)$ retrieves the corresponding point on M. By storing for each $Q_i$ the set of overlapping triangles $\Theta_i=\{T_j|dim(\phi(T_j)\cup Q_i)=2\}$, $\phi^{-1}$ can be evaluated very efficiently by locating $T_j\in\Theta_i:(\Psi_i+(u,v))\in\emptyset(T_j)$.

In some implementations, the process includes additional steps to address boundary singularities. Any negative boundary cross-field singularity for the mesh can be identified 410. This can occur during the extraction 405, as at least some quad parameterization is needed to identify negative boundary cross-field singularities. For example, the IGM parameterization includes several stages, and after the direction field and cross field setup stages, the locations of the parameterization singularities have been identified. Thus, the complete parameterization need not be computed before adjusting the singularities. If present, the one or more identified negative boundary cross-field singularities can be relocated 415 to an interior vertex of the mesh. Further details regarding this process are described below in connection with FIGS. 5B and 5C.

In any case, at least one boundary of the quad patch layout is mapped 420 to the one or more smooth boundary curves corresponding to the one or more modelled solids. For example, since $\phi: \delta M \rightarrow \delta \Omega$, the mapping $\delta \Omega \rightarrow \{C_i\}$ can be achieved by composing a curve $\Gamma$ for each $Y = \Psi_A \Psi_B \subset \delta \Omega$. Let $\phi^{-1}(Y) \rightarrow \mathbb{E} \subset \delta M$, where $\mathbb{E} = (E_0, E_1, \ldots, E_N)$, and $E_0(t_A) = \phi^{-1}(\Psi_A)$, $E_N(t_B) = \phi^{-1}(\Psi_B)$, $t_A \in [t_{0,0}, t_{0,1})$, $t_B \in (t_{N,0}, t_{N,1}]$. Joining the edge curve segments $C_0[t_A, t_{0,1}], C_1[t_{1,0}, t_{1,1}], \ldots, C_N[t_{N,0}, t_B]$ together yields the geometry of $\Gamma$. To complete the map $Y \rightarrow \Gamma$ and avoid dependency on the parameterizations of $\{C_i\}$, $\Gamma$ can be parameterized by its arc-length normalized to $[0,1]$. Where numerical integration is required to evaluate the arc-length functions $\{s_i(t) = \int_{t_{i,0}}^{t_{i,1}} |C'_i(t)| dt\}$, e.g., spline curves, an accurate B-spline approximation of $s_i$ can be precomputed using the techniques described in R. J. Sharpe, R. W. Thorne, Numerical method for extracting an arc length parameterization from parametric curves, Computer-Aided Design 14 (2) (1982) 79-81 and J. W. Peterson, Arc Length Parameterization of Spline Curves, Journal of Computer-Aided Design 14 (2) (2006).

Figure 4B:
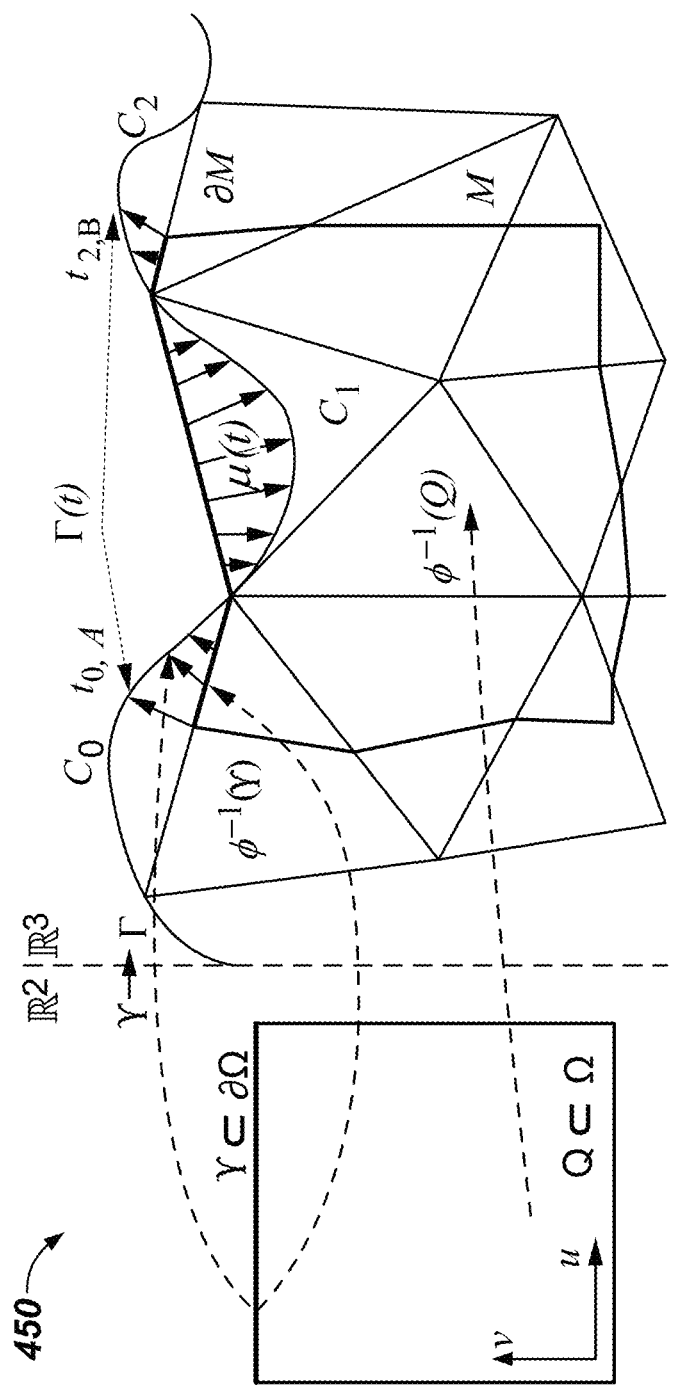
FIG. 4B is a graphical diagram showing an example of transfinite patch construction.

Surface patches are constructed 425 using the globally continuous map of the polygon mesh, the mapping of the at least one boundary of the quad patch layout to the one or more smooth boundary curves, and transfinite interpolation of the one or more smooth boundary curves. FIG. 4B is a graphical diagram showing an example 450 of transfinite patch construction. Let $\mathbb{D} = \{Q_i | \dim(Q_i \cup \delta \Omega) = 1\}$. For each $Q_i \in \mathbb{D}$, construct a patch $\tilde{M}_i$ blending the input mesh geometry $\phi^{-1}(Q_i)$ with the composite curves $\{\Gamma_j\}$ assigned to the boundary edges of $Q_i$. Let $\delta Q_i = \{Y_0, Y_1, Y_2, Y_3\}$ be the IGM edges ordered anti-clockwise along the isolines v=0, u=1, v=1, u=0. Let also $\phi_i^{-1}(u, v) = \phi^{-1}(Q_i, u, v)$, $(u, v) \in [0,1]^2$. $\forall Y_j$, if $Y_j \subset \delta \Omega$, define the vector field curve $\mu_j: [0,1] \rightarrow \mathbb{R}^3$ which represents the displacement from $\phi_{-1}(Y_j)$ to $\Gamma_j$ as follows:

| Displacement | Quad Boundary |
| --- | --- |
| $\mu_0(t) = \Gamma_0(t) - \phi_i^{-1}(t, 0)$ | v = 0 |
| $\mu_1(t) = \Gamma_1(t) - \phi_i^{-1}(1, t)$ | u = 1 |
| $\mu_2(t) = \Gamma_2(1 - t) - \phi_i^{-1}(t, 1)$ | v = 1 |
| $\mu_3(t) = \Gamma_3(1 - t) - \phi_i^{-1}(0, t)$ | u = 0 |

Otherwise, define $\mu_j = \vec{0} \in \mathbb{R}^3$. Then, construct the displacement Coons patch (see S. A.

Coons, Surfaces for Computer-Aided Design of Space Forms, Tech. rep. (1967)) $\Xi_i(u,v): [0,1]^2 \rightarrow \mathbb{R}^3$;

$$\Xi_i(u,v) = (1-v) \cdot \mu_0(u) + u \cdot \mu_1(v) + v \cdot \mu_2(u) + (1-u) \cdot \mu_3(v)$$

And finally, the transfinite interpolation patch:

$$\tilde{M}_i(u,v) = \phi_i^{-1}(u,v) + \Xi_i(u,v).$$

$\tilde{M}(\Omega)$ is composed from the patches $\tilde{M}_i \leftrightarrow Q_i$ where $\tilde{M}_{iE} = \phi_i^{-1}$ if $Q_i \notin \mathbb{D}$. The $C^0$ continuity of $\tilde{M}$ follows directly from the $C^0$ continuity of $\phi^{-1}$ and $\{\Gamma_i\}$.

Figure 5A:
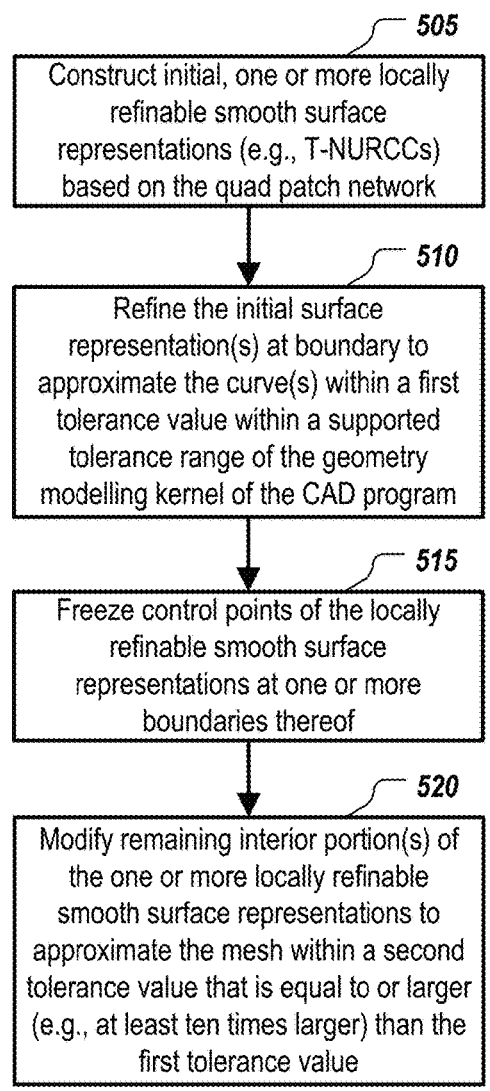
FIG. 5A is a flowchart showing an example of a process to define one or more locally refinable smooth surface representations using the quad patch network.

FIG. 5A is a flowchart showing an example of a process to define one or more locally refinable smooth surface representations using the quad patch network (e.g., an example of defining 235 in FIG. 2A). For example, this second stage of the process can approximate the patch network $\tilde{M}(\Omega)$ with a T-NURCC surface $S(\Omega)$. One or more initial locally refinable smooth surface representations (e.g., T-NURCCs, T-splines, LR B-splines, or hierarchical B-splines) are constructed 505 based on the quad patch network.

For example, the initial quad control mesh for the output surface S can be extracted from the IGM quad partitioning $\{Q_i\}$ described above. As all IGM singularities are located on input mesh vertices, there is no need for local refinement to accommodate "in-triangle" singularities. The initial quad layout of S is fully uniform, hence the knot interval value $d_i = 1$ can be set for each quad edge $Y_i$. As S is refined with local edge and quad splits (see T. W. Sederberg, D. L. Cardon, G. T. Finnigan, N. S. North, J. Zheng, T. Lyche, T-spline simplification and local refinement, in: ACM SIGGRAPH 2004 Papers on —SIGGRAPH '04, 2004, p. 276), the knot interval values are updated accordingly. Splitting $Y_i \rightarrow \{Y_j, Y_k\}$ creates the new knot intervals $d_j + d_k = d_i$. Correspondingly, quadrisecting $Q_i \rightarrow \{Q_{i,j,k}\}_{j,k=0,1}$ splits the quad side knot intervals $d_{i,u}$ and $d_{i,v}$, equal to the sum of the edge parameter intervals along the u and v sides.

In the following description, the quad domain partition of the refined T-NURCC surface is denoted with $\{Q_i\}$, and the initial quad partition is denoted with $\{\tilde{Q}_i\}$. Initially, each patch $S(\tilde{Q}_i)$ trivially corresponds to the patch $\tilde{M}_i$. When refining $\tilde{Q}_i$, the correspondence from each $Q_j \subset \tilde{Q}_i$ can be maintained using a parameter translation and scale map $n_{i,j}$: $Q_j(u, v) \rightarrow \tilde{Q}_i(\tilde{u}, \tilde{v})$, so $S(Q_j, u, v) \rightarrow \tilde{M}_i(n_{i,j}(u, v))$. In subsequent description herein, this detail is omitted, and $S(Q_j, u, v) \rightarrow \tilde{M}_i(u,v)$ is used instead.

To control the approximation at $\delta S$, Bézier boundary conditions can be set up by applying the standard method of adding a 0-channel of quad faces along $\delta \Omega$. FIG. 5B is a graphical diagram showing four boundary conditions. In FIG. 5B, solid lines represent the quad domains $\{Q_i\}$, and dashed lines represent 0-channel edges. Dots 550 represent the boundary control points, which control $\delta S$, and the larger dots 550 represent boundary $C^1$ discontinuity. Dots 552 represent control points which control the tangent plane along $\delta S$.

Where necessary, additional vertices are added along the boundary to interpolate boundary first derivatives and represent accurately input boundary corners. At regular boundary vertices and index 1 singularities (see regular vertex example 560, and convex corner vertex example 570 corresponding to an index 1 singularity) this process is equivalent to boundary knot insertion in tensor-product NURBS surfaces.

In addition, using local knot refinement, $G^1$ discontinuities can be created on regular vertices (see regular vertex example 565 representing a boundary corner with a $C^1$ discontinuity) to represent boundary corners away from map singularities. Local knot insertion can be used to create boundary control points defining both adjacent first derivatives along $\delta S$. The T-joints can be replicated on the interior 0-channel edges to allow tangent plane control.

However, concave boundary vertices on negative index singularities are significantly more complex to handle as discussed in Appendix A of J. Shen, J. Kosinka, M. Sabin, N. Dodgson, Converting a CAD model into a non-uniform subdivision surface, Computer Aided Geometric Design 48 (C) (2016) 17-35. If the $C^1$ discontinuity interior propagation approach is used to represent them (see concave corner vertex example 575 corresponding to an index −1 singularity), $C^1$ constraints should be added when solving the interior min $L^2$ problem (as described in detail below in connection with the modifying 520 operation). As with example 565, local knot insertion can be applied to provide control of the first derivatives in example 575. However, in this case, the added boundary knots are propagated 577 into the surface interior to prevent the interior basis function from affecting δS. This configuration can also be applied for higher valence boundary vertices.

However, in some implementations, an alternative approach can be employed for the concave corner vertices. Boundary singularities can be prevented everywhere except at $G^0$ joints of the curve segments by constraining the cross-field index of all non-corner boundary vertices to 0 when computing the mesh cross-field. Therefore, δS is $C^2$ away from any corner points, which reduces the surface complexity as there are no tangent control points on $C^1$ joints.

To avoid $C^1$ interior discontinuities emanating from concave boundary corners, a strategy similar to that described in T. W. Sederberg, G. T. Finnigan, X. Li, H. Lin, H. Ipson, Watertight trimmed NURBS, in: ACM SIGGRAPH 2008 papers on—SIGGRAPH '08, Vol. 27, ACM Press, New York, New York, USA, 2008, p. 1, can be adapted to represent such corners with adjacent interior singularities. This, in effect, replaces boundary conditions of the type in example 575 in FIG. 5B with the type in example 565 in FIG. 5B. To this end, during (or after) computation of the IGM (discussed above in connection with FIGS. 3A and 4A), negative boundary cross-field singularities can be relocated to nearby interior vertices as follows.

FIG. 5C is a graphical diagram showing an example of boundary singularity relocation. A negative boundary singularity 594 (a singularity index of −1) is shown on dotted lines 592, which represent the local quad partitions, overlaid on a mesh 590. As shown, the negative boundary singularity 594 is placed on a large interior angle $\alpha > \pi$ (concave) boundary vertex $V_i$. The singularity is relocated 594A to an adjacent interior vertex $V_j$ such that the edge connecting $V_i$, $V_j$ is as close as possible to the bisector of $\alpha$. This results in a regular vertex 596 replacing the negative singularity vertex 594 at the boundary.

Let $\mathbb{G}$ be the subset of input mesh boundary vertices assigned to negative index singularities. $\forall V_i \in \mathbb{G}$ corresponding interior vertices $\widehat{\mathbb{G}} = \{V_j\}$ are selected as shown in FIG. 5C. Then, the cross-field indices are swapped for all pairs $V_i \in \mathbb{G} \leftrightarrow V_j \in \widehat{\mathbb{G}}$, and the cross-field is updated. During the subsequent IGM re-computation, $\phi(V_i) \in \mathbb{Z}^2$, $\forall V_i \in \mathbb{G}$ can be forced by parameter quantization. Applying local knot insertion to the regular boundary control mesh vertices $\{\phi(V_i)\}$ to set up the boundary condition in example 565 of FIG. 5B allows representation of the corresponding corners at $\mathbb{G}$..

This technique has a few limitations worth noting. The input mesh near a vertex $V_i \in \mathbb{G}$ may be too coarse, so a suitable relocation vertex may be absent or too far from the bisector of the interior angle $\alpha$. This issue can be addressed by refining the input mesh locally to introduce more interior vertices. Also, if the accumulated interior angle is too large, e.g., $\alpha > 2\pi$, and the singularity index <−1, the relocation may introduce large parametric distortion which can lead to poor surface quality. In such cases, it is preferable to accept the interior $C^1$ discontinuities.

Returning to FIG. 5A, the one or more initial locally refinable smooth surface representations are refined 510 at one or more boundaries of the one or more initial locally refinable smooth surface representations (e.g., iterative approximation and refinement of the boundary of the refinable smooth surface until the curves on the B-rep are approximated by the boundary within a tolerance that the CAD program can consider them coincident). This refinement causes the smooth surface representations to approximate the one or more smooth boundary curves within a first tolerance value (a boundary tolerance value). The boundary approximation tolerance value controls the deviation from the boundaries during the conversion to boundary representation format. Thus, the boundary approximation tolerance should be set to a small enough value to ensure that the computer aided design program, e.g., CAD program(s) 116, will treat the smooth surface representations as meeting the modelled solid(s) at the smooth boundary curve(s) thereon.

The boundary approximation tolerance value can be set equal to or greater than the smallest dimension representable by the geometry modeling kernel of the computer aided design program and also be within a supported tolerance range of the geometry modeling kernel of the computer aided design program, e.g., small enough to allow the geometric modeling kernel of CAD program(s) 116 to consider curves within that tolerance coincident. For example, the boundary tolerance can be set to a value that is always within 100 (often less) times the resolution of the geometric kernel, keeping acceptable performance, and this tolerance value is small enough to allow the geometric kernel to consider the surface boundary exactly ON the B-rep. Note that setting the boundary approximation tolerance to a value that is smaller than the geometry modeling kernel resolution adds complexity without gaining additional useful accuracy. Further, the boundary approximation tolerance value can be set substantially higher than the minimum resolution (dimension) of the geometry modeling kernel while still achieving the goal of ensuring connection of the surfaces. Setting a larger value provides somewhat less accurate models, but leads to a more compact representation and faster run times. In some implementations, is set to 10 times or even 100 times the model resolution, as the resulting B-Rep model is still accurate enough and much more accurate than what can be achieved with existing methods. In some implementations, the high end of the tolerance range is up to 1000 times the kernel resolution because tolerance values in this range can still be small enough for the geometric kernel to consider the curve as coincident.

In some implementations, once $S(\Omega)$ is constructed, solving $L^\infty(\delta S, \delta M) < \xi$ includes the following iterative boundary approximation operations: solving min $L^2$, estimating $L^\infty$ and refining where appropriate. Eventually, the process converges when $L^\infty(\delta S, \delta \tilde{M}) < \xi$. For the boundary $L^2$ fit, note that δS consists of $C^2$ NURBS curves except at the corner points. Discretizing $L^2(\delta \tilde{M}, \delta S) = \int_{\delta \Omega} (\delta \tilde{M} - \delta S)^2$ can be done as follows:

$$L^2(\partial \tilde{M}, \partial S) = \sum_{Y \in \partial \Omega} \int_0^{d_Y} (\tilde{M}_Y(t) - S_Y(t))^2 dt \approx$$
$$\sum_{Y \in \partial \Omega} \sum_{t_k \in [0, d_Y]} w_k (\tilde{M}_Y(t_k) - S_Y(t_k))^2.$$

$\{(w_k, t_k)\}$ are the weights and corresponding uniform parameters of a Newton-Cotes quadrature formula approximating the $L^2$ integral over the interval $[0, d_Y]$ for each $Y \in \delta\Omega$. The order of the formula is based on the continuity of the corresponding composite curve Γ. Standard least squares system techniques can be applied to solve the min $L^2$ ($\delta \tilde{M}$, $\delta S$) problem for the control points along $\delta S$.

For boundary corners, let $\Psi$ be a boundary quad vertex representing a $C^1$ discontinuity as shown in examples 556, 570, 575 of FIG. 5B. Let $V \in \delta M$ be the corresponding input mesh corner vertex. $\delta S$ can be constrained at $\Psi$ by adding interpolation constraints to the least squares system for the position of V and the first derivatives $\Gamma'_i(d_i)$ and $\Gamma'_i(0)$, where $(Y_i, \Gamma_j)$ are its adjacent quad edges. These constraints force $\delta S$ to represent accurately the boundary shape at V.

With regard to boundary error, for each quad edge $Y \in \delta \Omega$, non-linear numerical optimization can be applied to compute $$L_Y^\infty = \max_{t \in [0, d_Y]} |\tilde{M}_Y(t) - S_Y(t)|.$$

$L_Y^\infty$ can be evaluated efficiently if interval subdivision is restricted to bisection and dyadic parameter samples are shared with the Newton-Cotes quadrature formulas (discussed above). However, since $$L^\infty(\partial S, \partial \tilde{M}) = \max_{\gamma \in \partial \Omega} L_\gamma^\infty$$

depends on $\phi$, it can lead to unnecessary refinement when a parametric error bound is not required. A useful, but a more expensive alternative is to compute the Hausdorff distance $H(\delta S, \delta \tilde{M})$ between corresponding boundary loop curves. Since $L^\infty(\delta S, \delta \tilde{M}) \geq H(\delta S, \delta \tilde{M})$, this geometric measure can lead to less refinement.

Figure 5D:
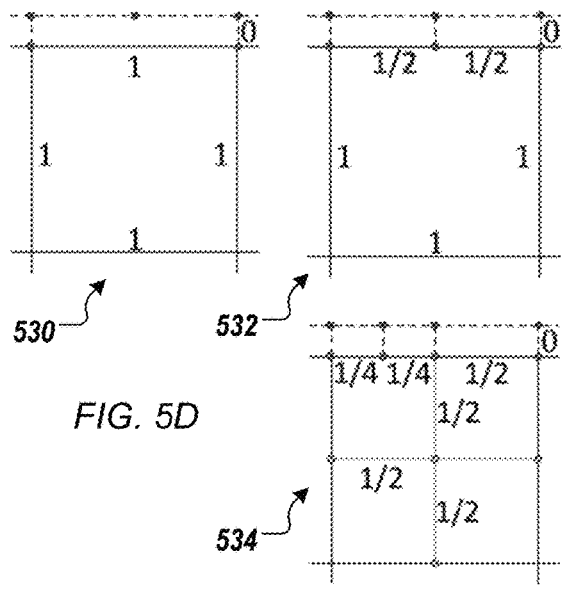
FIG. 5D is a graphical diagram showing an example of local knot insertion during boundary refinement and local refinement propagation to balance the surface domain.

FIG. 5D is a graphical diagram showing an example of local knot insertion during boundary refinement. For boundary refinement, all $\{Y_i | Y_i \in \delta \Omega \wedge L_{Y_i}^\infty \geq \xi\}$ can be bisected by a local knot insertion at the mid-parameter. As shown at 530 in FIG. 5D, an interior unit quad is adjacent to a boundary 0-channel quad with a bisected boundary edge. This choice integrates without $L^2$ and $L^\infty$ discretization, as the samples evaluated in these computations can be reused. To prevent highly non-uniform knot sequences, which can lead to surface quality issues, the boundary can be balanced by bisecting all edges according to $$\left\{ Y_i \mid \begin{array}{c} Y_i \subset \partial \Omega \wedge \exists Y_j \subset \partial \Omega \wedge Y_i \cap Y_j \neq \emptyset \\ d_i > 2 d_j > 0 \end{array} \right\}$$

The boundary edge splits are replicated on the corresponding 0-channel interior edges, bisecting the incident 0-channel quad. As shown at 532 in FIG. 5D, the split on the interior 0-channel edge is replicated, bisecting the 0-channel quad. The additional vertex controls the first derivative across the boundary and can be used by $G^1$ boundary conditions. As the boundary is refined, configurations can be created where small-support boundary basis functions overlap with larger interior basis functions. To avoid potential adverse effects of such non-uniform parameterization on the surface quality, the boundary refinement can be adaptively propagated into the interior of the surface by quadrisecting any quads $\{Q_i\}$ adjacent to the 0-channel if $d_i > 2 d_j$, where $d_i$ is the 0-channel quad side knot length, and $d_j$ is the knot length of the shortest 0-channel edge on this quad side. As shown at 534 in FIG. 5D, because bisecting one (or both) smaller 0-channel quad during subsequent refinement can cause the configuration to become unbalanced, the interior quad can be quadrisected to rebalance the layout. Further refinement into the interior may be required to rebalance the parameterization, as discussed in further detail below in connection with FIG. 5E.

Returning to FIG. 5A, the control points of the one or more locally refinable smooth surface representations are frozen 515 at the one or more boundaries. Fixing (freezing) the control points along $\delta S$ and restricting all modification to the interior of S ensures that the generated surface will not pull away from the contacts established with the modelled solid(s) and the smooth curve(s) thereon. This is true even though a much higher tolerance value can be used from this point on when approximating the interior of the mesh, e.g., iterate solving min $L^2$, estimating $L^\infty$ and refining until $L^\infty(\tilde{M}, S) < \delta$.

Remaining interior portions of the one or more locally refinable smooth surface representations are modified 520 to approximate the mesh. This modification causes the smooth surface representations to approximate the mesh within a second tolerance value (an interior tolerance value). The interior approximation tolerance value controls the deviation from the mesh during the conversion to boundary representation format. Thus, the interior approximation tolerance can be set much larger than the boundary approximation tolerance, and can even be an input parameter, e.g., input to CAD program(s) 116, providing user control of how closely the new surface should match the mesh.

The interior approximation tolerance value can be set equal to or greater than an accuracy of a method used to obtain the mesh. For example, when the mesh is obtained using one or more generative design processes, the interior approximation tolerance value can be set based on the generative design representation accuracy, e.g., greater than or equal to the generative design representation accuracy and also small enough to keep relevant features of the mesh. As another example, when the mesh is obtained by scanning (e.g., laser scanning) the interior approximation tolerance value can be set based on the accuracy of the scanning device, e.g., greater than or equal to the scanning device's representation accuracy.

Note that setting the interior approximation tolerance to a value that is smaller than the accuracy of the method used to obtain the mesh geometry adds complexity without gaining appreciable benefits. Further, much larger values can be used than the value used for the boundary. In some implementations, the second (interior) approximation tolerance is set at a value that is at least an order of magnitude (10 times) larger than the first (boundary) tolerance value. In some implementations, the second (interior) approximation tolerance is set at a value that is at least two orders of magnitude (100 times) larger than the first (boundary) tolerance value. In some implementations, the second (interior) approximation tolerance is set at a value that is at least three orders of magnitude (1000 times) larger than the first (boundary) tolerance value.

For the interior $L^2$ fit, let $d_{Q,u}$ and $d_{Q,v}$ be the parameter space intervals along the u and v directions of a quad Q, and $R_Q(u, v) = \tilde{M}_Q(u, v) - S_Q(u, v)$. The $L^2$ metric can be discretized using Newton-Cotes cubature:

$$L^2(\tilde{M}, S) = \int_\Omega (\tilde{M} - S)^2 dp = \sum_{Q \in \Omega} \int_0^{d_{Q,u}} \int_0^{d_{Q,v}} R_Q^2(u, v) dv du \approx$$

$$\sum_{Q \in \Omega} \sum_{u_k \in [0, d_{Q,u}]} \sum_{v_l \in [0, d_{Q,v}]} w_{k,l} R_Q^2(u_k, v_l).$$

$\{(u_k, v_l)\}$ defines a uniform sample grid over Q, and $\{w_{k,l}\}$ are the corresponding cubature weights. Since the interior of $\tilde{M}$ is $C^0$, the trapezoidal rule can be used with 5×5 grid.

Figure 5E:
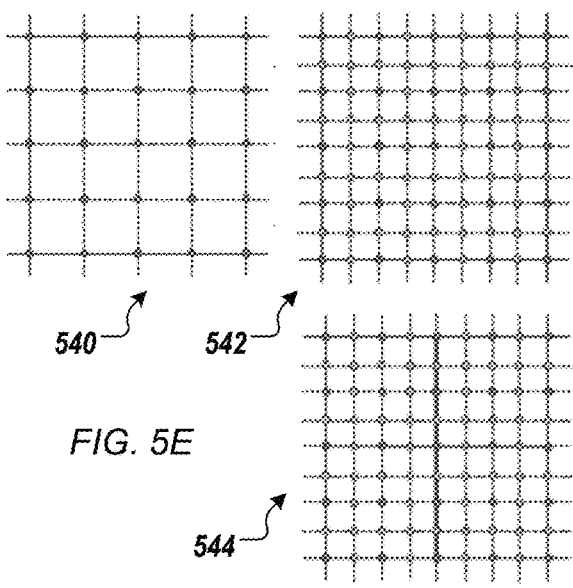
FIG. 5E is a graphical diagram showing an example of quad domain samples grid, nesting and refinement.

FIG. 5E is a graphical diagram showing an example of quad domain samples grid, nesting and refinement. As shown at 540, samples for the $L^2$ metric discretization are defined on a 5×5 grid. Each sample consists of the position on M and the S basis functions combination. Edge and vertex samples are reused for each incident quad. The least squares system is composed as in Li, Wan-Chiu, Ray, Nicolas, and Levy, Bruno, "Automatic and Interactive Mesh to T-spline Conversion", in *Proceedings of the Fourth Eurographics Symposium on Geometry Processing* (2006), pp. 191-200, except that the control point positions along $\delta S$ are fixed, and no fairing terms need be added to the energy.

If there are any interior $C^1$ discontinuities propagated from the boundary conditions setup (discussed in connection with the four paragraphs above beginning with "To control the approximation" and ending with "applied for higher valence boundary vertices") derivative interpolation constraints should be added across them to achieve $C^1$ interior continuity. These constraints can be applied on the interior control points 559 shown in FIG. 5B.

While multi-variate optimization can be used to compute accurately the parametric error $$L_Q^\infty = \max_{u \in [0, d_{Q,u}], v \in [0, d_{Q,v}]} |R_Q(u, v)|,$$

the computation cost is unacceptable in many applications. Instead, the current uniform dyadic grid of distance samples can be refined as shown at 542 in FIG. 5E, and $$L_Q^\infty = \max_{u \in [0, d_{Q,u}], v \in [0, d_{Q,v}]} |R_Q(u, v)|,$$

can be computed on the finer 9×9 grid. By doubling the sample grid resolution in both parameter directions, as shown at 542, when evaluating the $L^\infty$ error, this nests the refinement samples within the existing grid.

Quadrisection can then be applied, as shown at 544 in FIG. 5E, to refine all $\{Q_i | L_Q^\infty \geq \delta\}$ and balance the parameterization by quadrisecting the quads $$\left\{ Q_i \left| \begin{array}{l} \exists Q_j \wedge Q_i \cap Q_j \neq \emptyset \\ d_{i,u} \cdot d_{i,v} > 4 \cdot d_{j,u} \cdot d_{j,v} > 0 \end{array} \right. \right\}.$$

If a quad is subsequently refined, the finer quad grid samples are immediately available, and only the basis function combinations need be updated to account for the added control points. Note that extra care is needed when refining $Q_i \cap \delta\Omega = \{Y_j, Y_{j+1}, \ldots\}$. The local edge splits used might be already present on the boundary, or boundary edges may need to be split. In the latter case, any added boundary control points can be used to further improve the approximation along $\delta S$ by solving again min $L^2$ ($\delta\tilde{M}$, $\delta S$) (dis-cussed in the paragraph above beginning with "In some implementations, once $S(\Omega)$ is constructed) along all affected boundaries. This can be done once the interior iteration has been completed.

In practice, improved output surface quality is observed if more quads are refined as required to maintain the "standard" T-spline basis property, as described in T. W. Sederberg, J. Zheng, A. Bakenov, A. Nasri, T-splines and T-NURCCs, in: ACM Transactions on Graphics, Vol. 22, 2003, p. 477. Applying the method described in M. A. Scott, X. Li, T. W. Sederberg, T. J. Hughes, Local refinement of analysis-suitable T-splines, Computer Methods in Applied Mechanics and Engineering 213-216 (2012) 206-222, can keep the number of such quads low and prevent excessive output complexity. In some implementations, a greedy approach can be used, which can lead occasionally to excessive interior refinement.

Figure 6A:
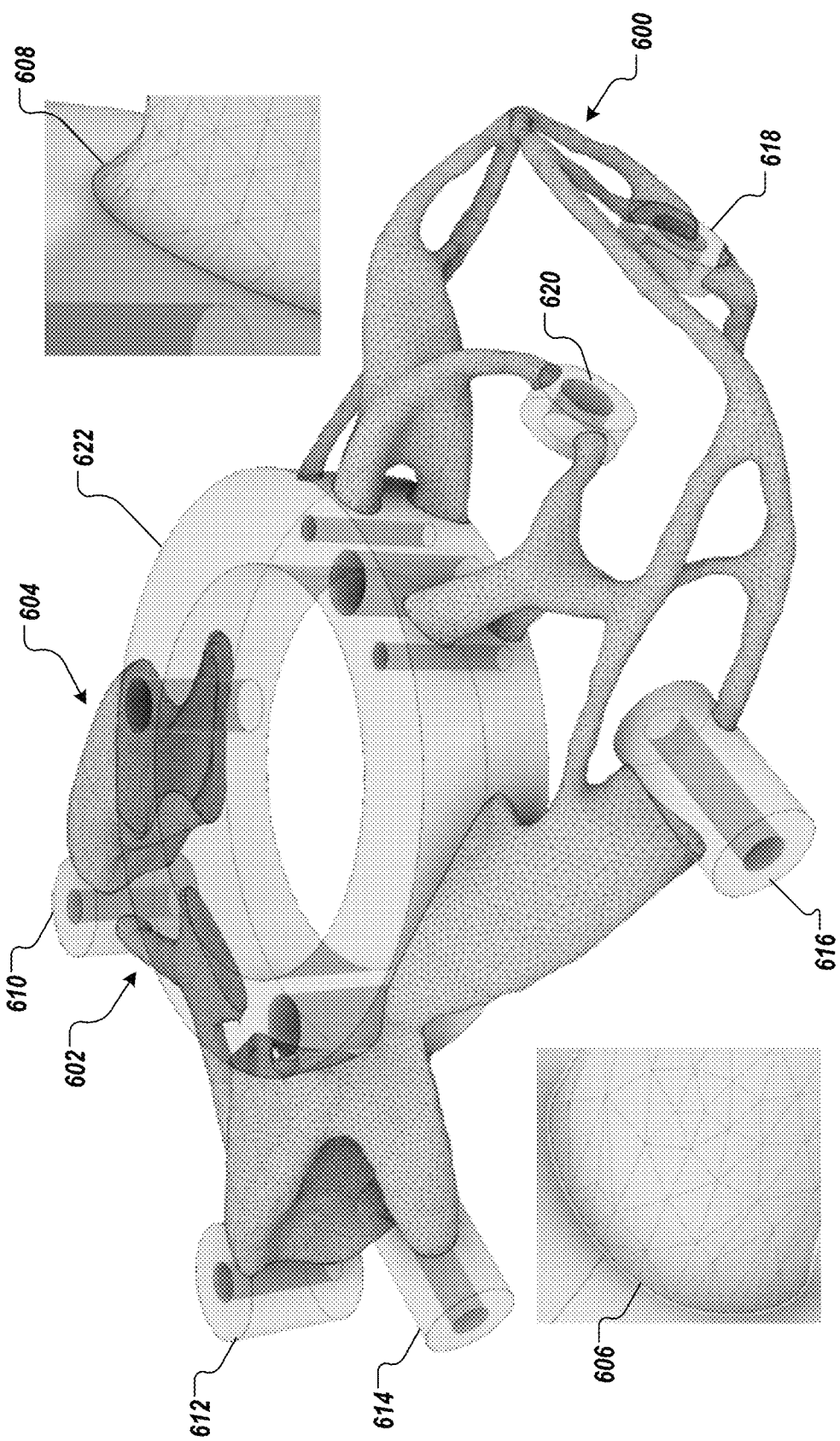
FIGS. 6A-6C show an example of results of the process applied to organic meshes produced by topology optimization and generative design applications.
Figure 6B:
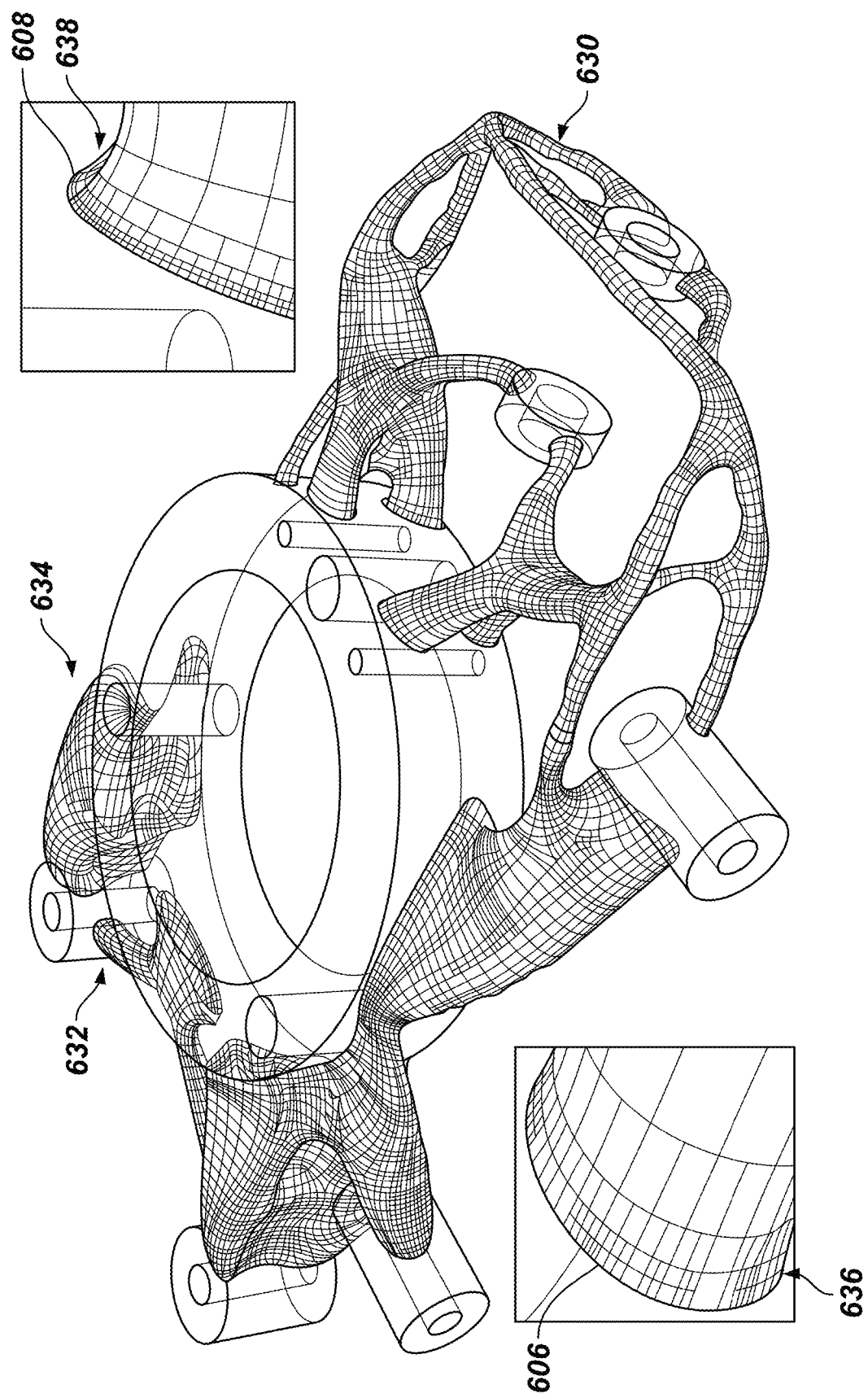
Figure 6C:
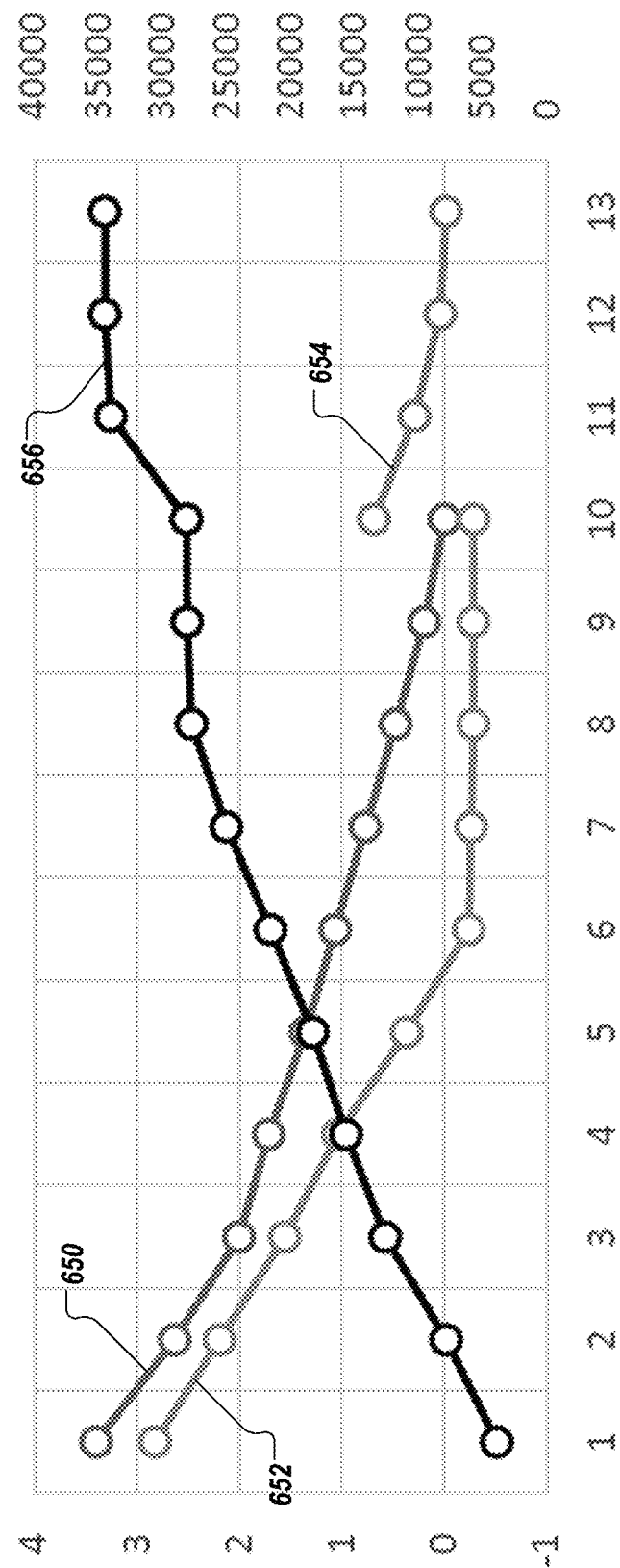

FIGS. 6A-6C show an example of results of the process applied to organic meshes produced by topology optimization and generative design applications. As shown in FIG. 6A, the generative design produces three organic meshes 600, 602, 604. All mesh boundaries are constrained to procedural trim-curves (e.g., curves 606, 608 shown in blown up regions of the 3D model) constructed to lie exactly on the existing non-organic surfaces 610, 612, 614, 616, 618, 620, 622 in the optimized B-Rep model. In this example, is set to 100× the B-Rep resolution. To make the tolerance values meaningful in the context of the conversion example, the value of $\xi$ is given relative to the bounding sphere diameter of the input mesh (e.g., $\xi = 3 \times 10_{-6}$). $\delta = 100\xi$ in this example.

FIG. 6B shows the resulting T-NURCC surfaces 630, 632, 634 produced for the organic meshes 600, 602, 604. As shown in blown up regions of the 3D model, the quad patches become more detailed 636, 638 as the surfaces approach the procedural trim-curves 606, 608. In addition, FIG. 6C is a chart showing approximation metrics at the iteration indicated on the horizontal axis. Plots 650, 652, 654 track the error measures $\log(L^\infty(\delta\tilde{M}, \delta S)/\xi)$, $\log(H(\delta\tilde{M}, \delta S)/\xi)$ and $\log(L^\infty(\tilde{M}, S)/\delta)$, respectively, with the error values shown on the left vertical axis. Since the boundary metrics are measured only for the boundary iterations, and $L^\infty(\tilde{M}, S)$ only for the interior iterations, these graphs may not cover the entire horizontal range. In addition, plot 656 tracks the number of output patches $|\{Q_i\}|$ after each iteration, and the values are shown on the right vertical axis. In this example, the final number of output patches $|\{Q_i\}|$ was 34,532, and the run time was 42 minutes (the run time here includes the IGM computation).

Figure 7:
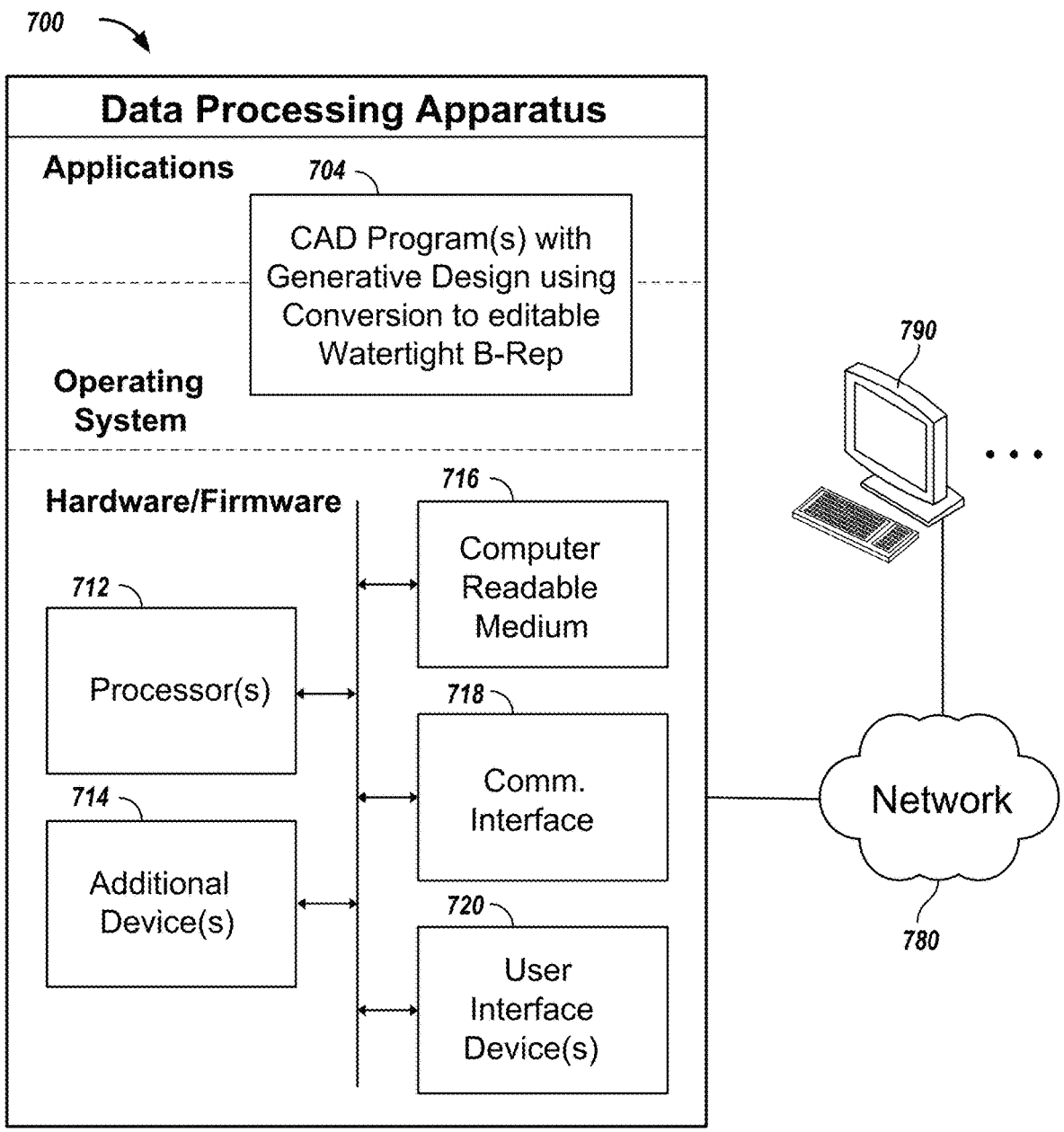
FIG. 7 is a schematic diagram of a data processing system including a data processing apparatus, which can be programmed as a client or as a server.

FIG. 7 is a schematic diagram of a data processing system including a data processing apparatus 700, which can be programmed as a client or as a server. The data processing apparatus 700 is connected with one or more computers 790 through a network 780. While only one computer is shown in FIG. 7 as the data processing apparatus 700, multiple computers can be used. The data processing apparatus 700 includes various software modules, which can be distributed between an applications layer and an operating system. These can include executable and/or interpretable software programs or libraries, including tools and services of one or more 3D modeling programs 704 that implement the systems and techniques described herein. Thus, the 3D modeling program(s) 704 can be CAD program(s) 704 that implement 3D modeling functions and conversion of mesh geometry to a watertight boundary representation for a part to be manufactured.

Further, the program(s) 704 can implement physical simulation operations (finite element analysis (FEA) or other), generative design operations (e.g., using level-set based method(s) for generative design), and/or manufacturing control operations (e.g., generating and/or applying toolpath specifications to effect manufacturing of designed objects). In some implementations, the program(s) 704 are CAD program(s) 704 with generative design functionality that uses conversion of mesh output to editable watertight B-Reps. The number of software modules used can vary from one implementation to another. Moreover, the software modules can be distributed on one or more data processing apparatus connected by one or more computer networks or other suitable communication networks.

The mesh geometry conversion functionality of the 3D modeling program(s) 704 (and likewise of CAD program(s) 116) can be designed to operate on boundary constrained meshes and approximate very tightly the smooth boundary curve constraints. This can be achieved using transfinite interpolation to reduce the total number of quad patches needed to accurately match smooth curves a the boundaries with the modelled solids. The mesh parameterization method used can be IGM, new control points can be added at the same time for all patches violating the error bound, and no fairing terms need be added to the $L^2$ energy. These choices complement well the boundary conforming components, and do not compromise the output surface quality in the interior. Moreover, the described process converges and performs robustly even for very detailed and complex organic meshes synthesized by topology optimization and generative design processes. Since the conversion surface boundaries conform to the boundary edges of the trimmed residual B-Reps, watertight CAD models with very small tolerances can be produced to meet the requirements of downstream modeling operations.

The data processing apparatus 700 also includes hardware or firmware devices including one or more processors 712, one or more additional devices 714, a computer readable medium 716, a communication interface 718, and one or more user interface devices 720. Each processor 712 is capable of processing instructions for execution within the data processing apparatus 700. In some implementations, the processor 712 is a single or multi-threaded processor. Each processor 712 is capable of processing instructions stored on the computer readable medium 716 or on a storage device such as one of the additional devices 714. The data processing apparatus 700 uses the communication interface 718 to communicate with one or more computers 790, for example, over the network 780. Examples of user interface devices 720 include a display, a camera, a speaker, a microphone, a tactile feedback device, a keyboard, a mouse, and VR and/or AR equipment. The data processing apparatus 700 can store instructions that implement operations associated with the program(s) described above, for example, on the computer readable medium 716 or one or more additional devices 714, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that produces an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
    obtaining a first computer model of a three dimensional object, wherein the first computer model comprises a polygon mesh associated with one or more boundary curves;
    producing a quad parameterization computer model of the polygon mesh, wherein the quad parameterization computer model comprises quad parameter domains on the polygon mesh, and wherein at least the quad parameter domains that are adjacent to the one or more boundary curves interpolate the one or more boundary curves; and
    forming a second computer model of the three dimensional object, wherein the forming comprises
        constructing one or more locally refinable surface representations from the quad parameterization computer model,
        refining one or more boundaries of the one or more locally refinable surface representations to approximate the one or more boundary curves within a first tolerance value set in accordance with a smallest dimension representable by a geometry modeling kernel used for the second computer model of the three dimensional object,
        freezing control points of the one or more locally refinable surface representations at the one or more boundaries, and
        modifying remaining interior portions of the one or more locally refinable surface representations to approximate the polygon mesh within a second tolerance value that is at least an order of magnitude larger than the first tolerance value.

2. The method of claim 1, comprising:
    identifying at least one negative boundary cross-field singularity for the polygon mesh; and
    relocating the at least one negative boundary cross-field singularity to an interior vertex of the polygon mesh.

3. The method of claim 1, wherein producing the quad parameterization computer model comprises:
    partitioning the polygon mesh into the quad parameter domains; and
    transfinitely interpolating the one or more boundary curves using at least the quad parameter domains that are adjacent to the one or more boundary curves.

4. The method of claim 3, comprising obtaining user input specifying a quad size, a quad shape, or both, which changes an influence area of the one or more boundary curves on the one or more locally refinable surface representations constructed from the quad parameterization computer model.

5. The method of claim 1, comprising obtaining user input specifying the second tolerance value.

6. The method of claim 1, comprising obtaining user input that defines the one or more boundary curves.

7. The method of claim 1, comprising obtaining the one or more boundary curves automatically.

8. The method of claim 7, wherein obtaining the one or more boundary curves automatically comprises:
   projecting one or more boundaries of the polygon mesh on each of one or more modelled solids in a boundary representation format to produce projected points on at least one face of the one or more modelled solids in the boundary representation format; and
   interpolating the projected points on the at least one face of the one or more modelled solids to produce the one or more boundary curves.

9. The method of claim 8, wherein the polygon mesh comprises a triangular mesh that results from a generative design process that employs the one or more modelled solids in the generative design process.

10. The method of claim 9, wherein the one or more locally refinable surface representations comprise one or more Non-Uniform Rational Catmull-Clark Surfaces with T-junctions.

11. The method of claim 1, wherein the one or more boundary curves are at least two boundary curves that meet at a corner point, and the forming comprises reproducing exactly the corner point in the one or more locally refinable surface representations.

12. A system comprising:
   at least one non-transitory storage medium having instructions of a computer aided design program stored thereon; and
   one or more data processing apparatus configured to perform the instructions of the computer aided design program resulting in operations comprising:
      obtaining a first computer model of a three dimensional object, wherein the first computer model comprises a polygon mesh associated with one or more boundary curves;
      producing a quad parameterization computer model of the polygon mesh, wherein the quad parameterization computer model comprises quad parameter domains on the polygon mesh, and wherein at least the quad parameter domains that are adjacent to the one or more boundary curves interpolate the one or more boundary curves; and
      forming a second computer model of the three dimensional object, wherein the forming comprises
         constructing one or more locally refinable surface representations from the quad parameterization computer model,
         refining one or more boundaries of the one or more locally refinable surface representations to approximate the one or more boundary curves within a first tolerance value set in accordance with a smallest dimension representable by a geometry modeling kernel used for the second computer model of the three dimensional object,
         freezing control points of the one or more locally refinable surface representations at the one or more boundaries, and
         modifying remaining interior portions of the one or more locally refinable surface representations to approximate the polygon mesh within a second tolerance value that is at least an order of magnitude larger than the first tolerance value.

13. The system of claim 12, wherein the one or more data processing apparatus is configured to perform the instructions of the computer aided design program resulting in the operations comprising:
   identifying at least one negative boundary cross-field singularity for the polygon mesh; and
   relocating the at least one negative boundary cross-field singularity to an interior vertex of the polygon mesh.

14. The system of claim 12, wherein producing the quad parameterization computer model comprises:
   computing a global quad map that partitions the polygon mesh into the quad parameter domains; and
   blending the global quad map with at least the quad parameter domains that are adjacent to the one or more boundary curves using transfinite interpolation of the one or more boundary curves.

15. The system of claim 14, wherein the one or more data processing apparatus is configured to perform the instructions of the computer aided design program resulting in the operations comprising obtaining user input specifying a quad size, a quad shape, or both, which changes an influence area of the one or more boundary curves on the one or more locally refinable surface representations constructed from the quad parameterization computer model.

16. The system of claim 12, wherein the one or more data processing apparatus is configured to perform the instructions of the computer aided design program resulting in the operations comprising obtaining user input specifying the second tolerance value.

17. The system of claim 12, wherein the one or more data processing apparatus is configured to perform the instructions of the computer aided design program resulting in the operations comprising obtaining user input that defines the one or more boundary curves.

18. The system of claim 12, wherein the one or more data processing apparatus is configured to perform the instructions of the computer aided design program resulting in the operations comprising obtaining the one or more boundary curves automatically.

19. The system of claim 18, wherein obtaining the one or more boundary curves automatically comprises:
   projecting one or more boundaries of the polygon mesh on each of one or more modelled solids in a boundary representation format to produce projected points on at least one face of the one or more modelled solids in the boundary representation format; and
   interpolating the projected points on the at least one face of the one or more modelled solids to produce the one or more boundary curves.

20. The system of claim 19, wherein the polygon mesh comprises a triangular mesh that results from a generative design process that employs the one or more modelled solids in the generative design process.

21. The system of claim 20, wherein the one or more locally refinable surface representations comprise one or more Non-Uniform Rational Catmull-Clark Surfaces with T-junctions.

22. The system of claim 12, wherein the one or more boundary curves are at least two boundary curves that meet at a corner point, and the forming comprises reproducing exactly the corner point in the one or more locally refinable surface representations.

* * * * *